US012153858B2

(12) United States Patent
Shahbazi Mirzahasanloo et al.

(10) Patent No.: US 12,153,858 B2
(45) Date of Patent: Nov. 26, 2024

(54) VOICE ACTIVATION FOR COMPUTING DEVICES

(71) Applicant: QUALCOMM Incorporated, San Diego, CA (US)

(72) Inventors: Taher Shahbazi Mirzahasanloo, San Diego, CA (US); Rogerio Guedes Alves, Macomb Township, MI (US); Lae-Hoon Kim, San Diego, CA (US); Erik Visser, San Diego, CA (US); Dongmei Wang, Bellevue, WA (US); Fatemeh Saki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 16/800,735

(22) Filed: Feb. 25, 2020

(65) Prior Publication Data

US 2020/0278832 A1 Sep. 3, 2020

Related U.S. Application Data

(60) Provisional application No. 62/811,906, filed on Feb. 28, 2019.

(51) Int. Cl.
*G10L 15/08* (2006.01)
*G02B 27/01* (2006.01)
(Continued)

(52) U.S. Cl.
CPC ......... *G06F 3/167* (2013.01); *G02B 27/0172* (2013.01); *G06F 3/011* (2013.01);
(Continued)

(58) Field of Classification Search
CPC .......... G10L 15/20; G10L 17/00; G10L 15/08
(Continued)

(56) References Cited

U.S. PATENT DOCUMENTS 10,390,120 B1 * 8/2019 Yang ........................ G06F 3/167
2011/0161085 A1 * 6/2011 Boda ....................... G10L 13/00
704/E13.011
(Continued)

OTHER PUBLICATIONS

Anonymous: "ISO/IEC JTC 1/SC 29 N ISO/IEC 23008-3:2015/ PDAM 3 Information Technology—High Efficiency Coding and Media Delivery in Heterogeneous Environments—Part 3: Part 3: 3D Audio, Amendment 3: MPEG-H 3D Audio Phase 2", Jul. 25, 2015 (Jul. 25, 2015), XP055329830. Retrieved from the Internet: URL: http://mpeg.chiariglione.orgjstandards/mpeg-hj3d-audiojtext-isoiec-23008-3201xpdam-3-mpeg-h-3d-audio-phase-2, 84 pages.
(Continued)

*Primary Examiner* — George C Monikang
(74) *Attorney, Agent, or Firm* — QUALCOMM Incorporated; Espartaco Diaz Hidalgo

(57) ABSTRACT

In general, techniques are described that enable voice activation for computing devices. A computing device configured to support an audible interface that comprises a memory and one or more processors may be configured to perform the techniques. The memory may store a first audio signal representative of an environment external to a user associated with the computing device and a second audio signal sensed by a microphone coupled to a housing of the computing device. The one or more processors may verify, based on the first audio signal and the second audio signal, that the user activated the audible interface of the computing device, and obtain, based on the verification, additional audio signals representative of one or more audible commands.

28 Claims, 19 Drawing Sheets

(51) Int. Cl.
| | |
|---|---|
| G06F 3/01 | (2006.01) |
| G06F 3/16 | (2006.01) |
| G06T 19/00 | (2011.01) |
| G10L 15/20 | (2006.01) |
| G10L 17/00 | (2013.01) |
| H04R 1/10 | (2006.01) |
| H04R 5/033 | (2006.01) |

(52) U.S. Cl.
CPC ......... *G06T 19/006* (2013.01); *H04R 1/1008* (2013.01); *H04R 1/1016* (2013.01); *H04R 5/033* (2013.01)

(58) Field of Classification Search
USPC .................. 704/231, 233, 246, 251; 381/74
See application file for complete search history.

(56) References Cited

U.S. PATENT DOCUMENTS

| | | | |
|---|---|---|---|
| 2011/0249821 A1 | 10/2011 | Jaillet et al. | |
| 2014/0177869 A1* | 6/2014 | Percy | H04R 3/005 381/97 |
| 2014/0185819 A1* | 7/2014 | Gleissner | H04R 1/1083 381/71.6 |
| 2015/0222996 A1* | 8/2015 | Chu | H04R 25/43 381/313 |
| 2015/0348551 A1* | 12/2015 | Gruber | G10L 15/1822 704/235 |
| 2015/0350762 A1* | 12/2015 | Birger | H04R 1/1016 381/74 |
| 2017/0235335 A1* | 8/2017 | Miller | G06F 1/163 381/334 |
| 2019/0304443 A1* | 10/2019 | Bhagwan | G06F 3/167 |

OTHER PUBLICATIONS

Audio: "Call for Proposals for 3D Audio", International Organisation for Standardisation Organisation Internationale De Normalisation ISO/IEC JTC1/SC29/WG11 Coding of Moving Pictures and Audio, ISO/IEC JTC1/SC29/WG11/N13411, Geneva, Jan. 2013, pp. 1-20.

ETSI TS 103 589 V1.1.1, "Higher Order Ambisonics (HOA) Transport Format", Jun. 2018, 33 pages.

Hierre, et al., "MPEG-H 3D Audio—The New Standard for Coding of Immersive Spatial Audio," IEEE Journal of Selected Topics in Signal Processing, vol. 9, No. 5, Aug. 2015, pp. 770-779.

Hollerweger F., "An Introduction to Higher Order Ambisonic," Oct. 2008, pp. 13, Accessed online [Jul. 8, 2013].

"Information technology—High Efficiency Coding and Media Delivery in Heterogeneous Environments—Part 3: 3D Audio," ISO/IEC JTC 1/SC 29/WG11, ISO/IEC 23008-3, 201x(E), Oct. 12, 2016, 797 Pages.

"ISO/IEC DIS 23008-3 Information Technology—High Efficiency coding and media delivery in heterogeneous environments—Part 3: 3D audio," Jul. 25, 2014 (Jul. 25, 2014), XP055205625, Retrieved from the Internet URL: http://mpeg.chiariglione.org/standards/mpeg-h/3d-audio/dis-mpeg-h-3d-audio [retrieved on Jul. 30, 2015], 433 pages.

ISO/IEC/JTC: "ISO/IEC JTC 1/SC 29 N ISO/IEC CD 23008-3 Information technology—High efficiency coding and media delivery in heterogeneous environments—Part 3: 3D audio," Apr. 4, 2014 (Apr. 4, 2014), 337 Pages, XP055206371, Retrieved from the Internet: URL:http://www.iso.org/iso/iso_catalogue/catalogue_tc/catalogue_to_browse.htm?commid=45316 [retrieved on Aug. 5, 2015].

"Multiple Time Series", Chapter 7, Nov. 13, 2013, pp. 87-97.

Poletti M.A., "Three-Dimensional Surround Sound Systems Based on Spherical Harmonics", The Journal of the Audio Engineering Society, vol. 53, No. 11, Nov. 2005, pp. 1004-1025.

Schonefeld V., "Spherical Harmonics," Jul. 1, 2005, XP002599101, 25 Pages, Accessed online [Jul. 9, 2013] at URL:http://heim.c-otto.de/~volker/prosem_paper.pdf.

Sen D., et al., "RM1-HOA Working Draft Text", 107. MPEG Meeting; Jan. 13, 2014-Jan. 17, 2014; San Jose; (Motion Picture Expert Group or ISO/IEC JTC1/SC29/WG11), No. m31827, Jan. 11, 2014 (Jan. 11, 2014), 83 Pages, XP030060280.

Sen D., et al., "Technical Description of the Qualcomm's HoA Coding Technology for Phase II", 109. MPEG Meeting; Jul. 7, 2014-Nov. 7, 2014; Sapporo; (Motion Picture Expert Group or ISO/IEC JTC1/SC29/ WG11), No. m34104, Jul. 2, 2014 (Jul. 2, 2014), 4 Pages, XP030062477, figure 1.

* cited by examiner

VOICE ACTIVATION FOR COMPUTING DEVICES

This application claims the benefit of U.S. Provisional Application No. 62/811,906, filed Feb. 28, 2019, and entitled "VOICE ACTIVATION FOR COMPUTING DEVICES," the entire contents of which are hereby incorporated by reference as if set forth in its entirety.

TECHNICAL FIELD

This disclosure relates to wearable devices, and more specifically, voice activation for computing devices.

BACKGROUND

Computing devices are increasingly providing audible interfaces with which a user may interact by issuing one or more audible commands. The computing device may operate in a low power or, in other words, a standby state or mode prior to activating the audible interface in an effort to reduce power consumption (which may be beneficial particularly when the computing device is powered using a limited power source, such as a battery). The computing device may only activate a non-zero subset of a number of different microphones of the computing device to detect a keyword that activates the audible interface in an effort to reduce power consumption in the low power state. The keyword may be selected such that the keyword is distinct and detectable in low resolution audio signal as the subset of microphones may only provide an audio signal in low resolution.

Responsive to detecting the keyword, the computing device activates the audible interface and potentially enters an active (or other words, high) power state that consumes more power than the low power state. Once in the active power state, the computing device may configure all or some larger subset of the different microphones to detect, in higher resolution, the one or more audible commands. The computing device may process the one or more audible commands and generate one or more audible responses, which the computing device may play via one or more transducers (e.g., speakers).

SUMMARY

In general, various aspects of the voice activation techniques are directed to activating audible interfaces for computing devices. Rather than activate the audible interface responsive to detecting a keyword regardless of the person speaking the keyword, the voice activation techniques may enable the computing device to differentiate between a user of the computing device speaking the keyword and any other non-authorized entity (such as a person or another computing device) issuing an audible sound that includes the keyword, thereby potentially eliminating activation of the audible interface by the non-authorized entity.

As such, various aspects of the voice activation techniques may improve operation of the computing device itself as the computing device may conserve power by possibly avoiding unauthorized activation of the audible interfaces by the non-authorized entity. The computing device may conserve power because processor cycles, (and accompanying memory bandwidth, memory storage, etc.) may not be wasted on the unauthorized activation of the audible interfaces by the non-authorized entity. Accordingly, various aspects of the voice activation techniques may improve operation of the computing device itself.

In one aspect, this disclosure is directed to a computing device configured to support an audible interface, the computing device comprising: a memory configured to store a first audio signal representative of an environment external to a user associated with the computing device and a second audio signal sensed by a microphone coupled to a housing of the computing device; and one or more processors configured to: verify, based on the first audio signal and the second audio signal, that the user activated the audible interface of the computing device; and obtain, based on the verification, additional audio signals representative of one or more audible commands.

In another aspect, this disclosure is directed to a method of supporting an audible interface, the method comprising: obtaining a first audio signal representative of an environment external to a user associated with a computing device; obtaining a second audio signal sensed by a microphone coupled to a housing; verifying, based on the first audio signal and the second audio signal, that the user activated the audible interface of the computing device; and obtaining, based on the verification, additional audio signals representative of one or more audible commands.

In another aspect, this disclosure is directed to a computing device configured to support an audible interface, the computing device comprising: means for obtaining a first audio signal representative of an environment external to a user associated with the computing device; means for obtaining a second audio signal sensed by a microphone coupled to a housing; means for verifying, based on the first audio signal and the second audio signal, that the user activated the audible interface of the computing device; and means for obtaining, based on the verification, additional audio signals representative of one or more audible commands.

In another aspect, this disclosure is directed to a non-transitory computer readable storage medium storing instructions that, when executed, cause one or more processors of a computing device to: obtain a first audio signal representative of an environment external to a user associated with the computing device; obtain a second audio signal sensed by a microphone coupled to a housing; verify, based on the first audio signal and the second audio signal, that the user activated the audible interface of the computing device; and obtain, based on the verification, additional audio signals representative of one or more audible commands.

The details of one or more aspects of the techniques are set forth in the accompanying drawings and the description below. Other features, objects, and advantages of these techniques will be apparent from the description and drawings, and from the claims.

DETAILED DESCRIPTION

Figure 1A:
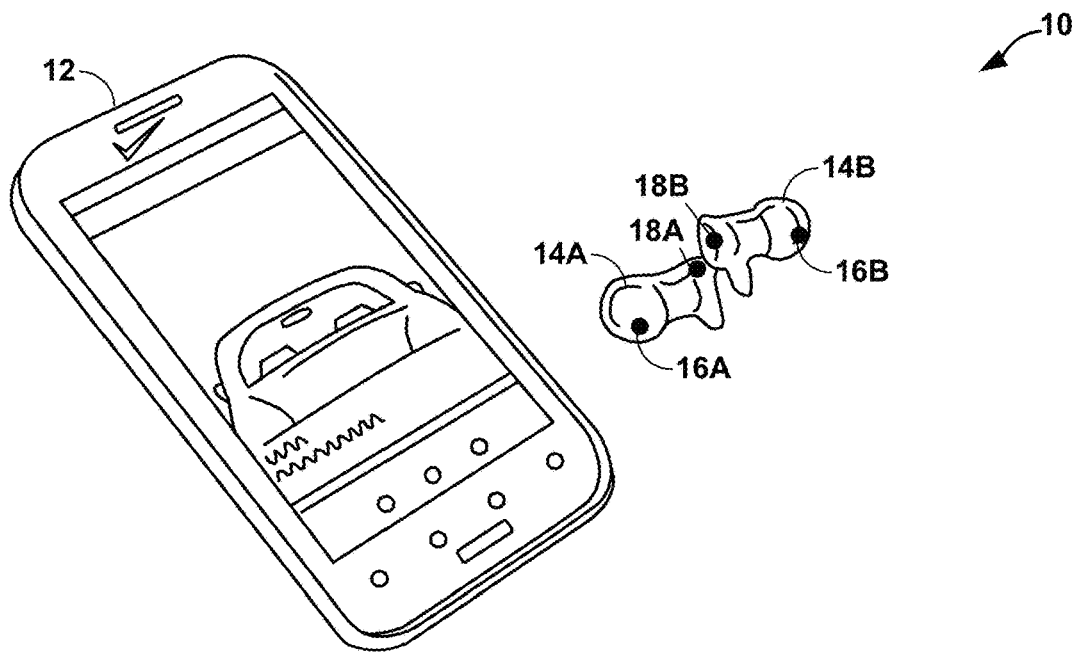
FIGS. 1A-1C are diagrams illustrating a system configured to perform various aspects of the voice activation detection techniques described in this disclosure.

Computing devices are increasingly providing audible interfaces with which a user may interact by issuing one or more audible commands. The computing device may operate in a low power or, in other words, a standby state or mode prior to activating the audible interface in an effort to reduce power consumption (which may be beneficial particularly when the computing device is powered using a limited power source, such as a battery). The computing device may only activate a non-zero subset of a number of different microphones of the computing device to detect a keyword that activates the audible interface in an effort to reduce power consumption in the low power state. The keyword may be selected such that the keyword is distinct and detectable in low resolution audio signal as the subset of microphones may only provide an audio signal in low resolution.

To reduce the ability of unauthorized users from activating the audible interface, the computing device may attempt to validate that the user and not unauthorized users were attempting to activate the audible interface. To validate the user, the computing device may interface with the user, prompting the user to say the keyword (and possibly multiple times). The computing device may capture via one or more microphones voice audio data representative of the spoken keyword by the user. The computing device may then train, using the voice audio data, one or more models, such as a neural network, deep neural network, or other types of models, so that the one or models detect the specific way in which the user speaks the keyword, which may thereby prevent unauthorized users from speaking the keyword to activate the audible interface of the computing device.

However, the increased security provided by models trained only to detect the keyword as spoken by the user may result in a more complex (in terms of processing cycles expended, memory bandwidth and storage space) process that consumes more power. Further, trained models may struggle to detect the keyword in noisy or other conditions, or may fail to validate the user despite speaking the keyword due to ailments that result in a different voice print or other temporary changes in how the user speaks (e.g., numbing from dental work, injury, etc.).

In accordance with various aspects of the techniques described in this disclosure, the system may differentiate between the user of the computing device speaking the keyword and any other non-authorized entity (such as a person or another computing device) issuing an audible sound that includes the keyword, thereby potentially eliminating activation of the audible interface by the non-authorized entity. Further, the computing device may not rely on complicated models trained specifically to the voice signature of the user, but may rely on comparisons of various aspects of ear cup audio signal (or, in other words, ear cup audio data) captured by ear cup microphones coupled to an ear-cup-type component of a wearable device and external audio signal (or, in other words, external audio data) captured by external microphones and representative of an environment external to the user.

The computing device may in this way verify, based on the external audio signal and the ear cup audio signal, that the user activated the audible interface of the computing device. The computing device may then perform keyword detection with regard to the external audio signal and/or the ear cup audio signal only after verifying that the user activated the audible interface of the computing device, thereby potentially saving power by only expending processing resources to detect the keyword when the user spoke the keyword. Responsive to detecting that the user spoke the keyword, the computing device may then activate, based on the verification, the additional microphones to obtain high resolution audio signals (or, in other words, high resolution audio data, which may represent additional audio signal or data) representative of the one or more audible commands.

Figure 1B:
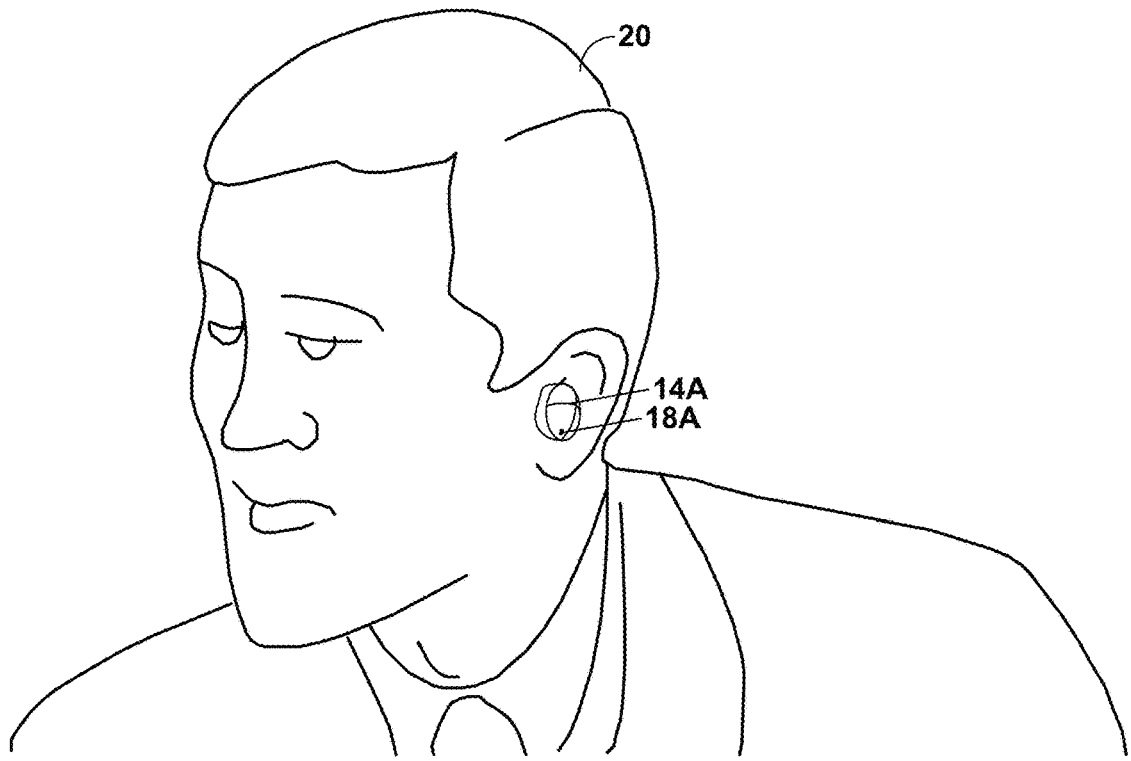
Figure 1C:
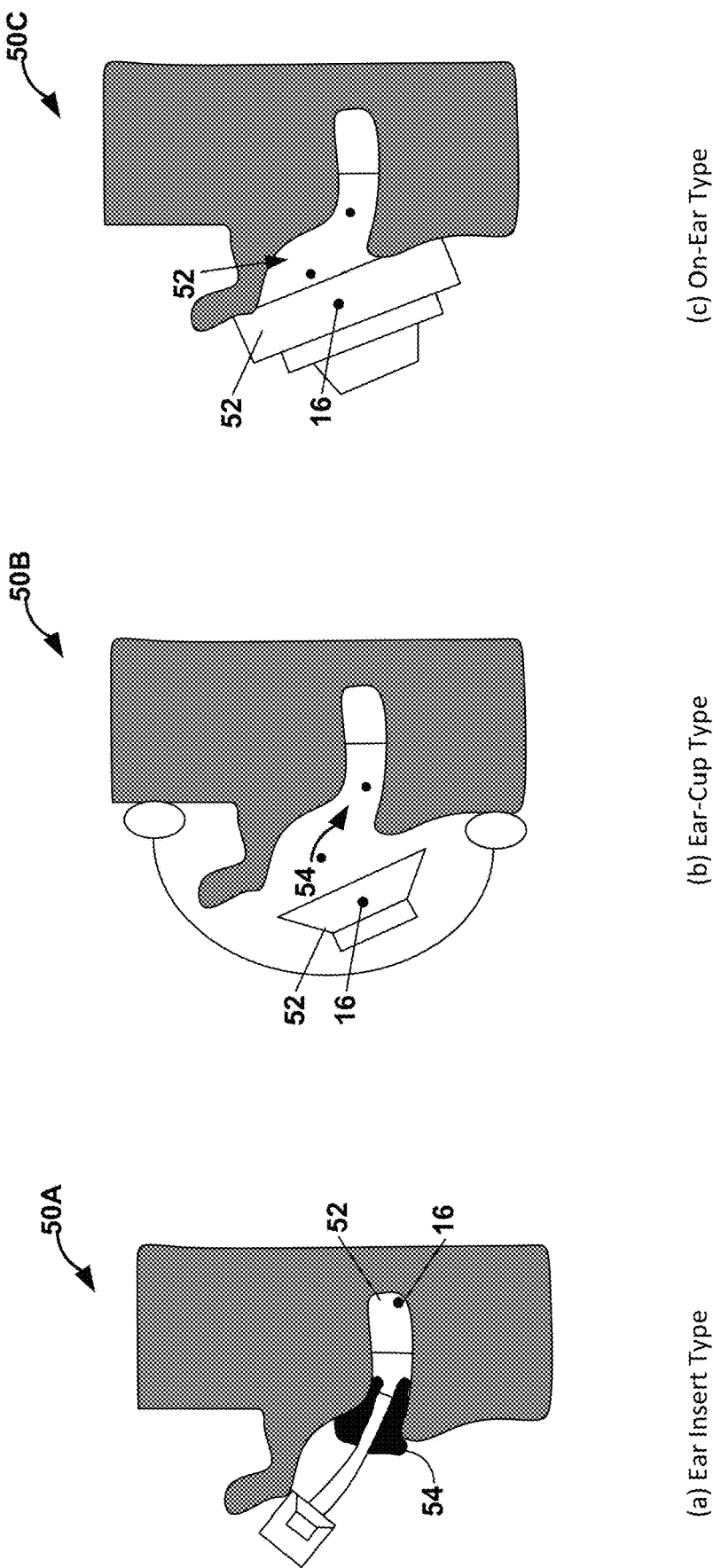

FIGS. 1A-1C are diagrams illustrating a system 10 configured to perform various aspects of the voice activation detection techniques described in this disclosure. As shown in the example of FIG. 1A, the system 10 includes a computing device 12 and computing devices 14A and 14B ("computing devices 14"), where the computing device 12 may be connected to computing device 14 and as such may be referred to as a connected computing device 12.

In the example of FIG. 1A, the connected computing device 12 is a smartphone, while the computing devices 14 are a pair of wireless earbuds, which may refer to a type of headphone having transducers for playback of audio content. Although described with respect to the smartphone shown in the example of FIG. 1A, the connected computing device 12 may include any other type of device, including a handset (or cellular phone), a tablet computer, a remotely piloted aircraft (such as a so-called "drone"), a robot, a desktop computer, a receiver (such as an audio/visual—AV—receiver), a set-top box, a television (including so-called "smart televisions"), a media player (such as a digital video disc player, a streaming media player, a Blue-Ray Disc™ player, etc.), a smart speaker or other types of digital assistant devices, an augmented reality device, a virtual reality device, a mixed-reality device, a head-mounted display, or any other device capable of communicating audio data wirelessly or via wired connection to the computing devices 14.

As further shown in the example of FIG. 1A, wireless earbud 14A may include an ear cup microphone 16A and an external microphone 18A, while wireless earbud 14B may include an ear cup microphone 16B and an external microphone 18B. Although shown as both of the wireless earbuds 14 including a respective one of the ear cup microphones 16A and 16B ("ear cup microphones 16") and a respective one of the external microphones 18A and 18B ("external microphones 18"), only one of the wireless earbuds 14 may include both the ear cup microphones 16 and the external microphones 18, one of the wireless earbuds 14 may include the ear cup microphone 16 while the other one of the wireless earbuds includes the external microphone 18, or the wireless earbuds 14 may utilize any other conceivable arrangement of the ear cup microphones 16 and the external microphones 18.

Moreover, although described with respect to wireless earbuds 14, the computing device 12 may include any other type of device with an arrangement of user cup microphones and external microphones, including wired or wireless versions of wearables, such as virtual reality devices, mixed reality devices, augmented reality devices, head-mounted displays, headsets (which may refer to headphones having a microphone for sensing audio signals, where the wireless earbuds 14 represents one such example of a headset), hearing aids or other hearing impaired devices that facilitate hearing by the human auditory system, digital assistant devices, smart headphones, and the like. In addition, while described below with respect to the connected computing device 12, various aspects of the techniques may be performed solely or only by the computing device 12 without the support of the connected computing device 14.

As noted above, the smartphone 12 may be wirelessly connected to the wireless earbuds 14. In some examples, the smartphone 12 may be wirelessly connected to only one of the wireless earbuds 14, where the one of the wireless earbuds 14 connected to the smartphone 12 may be in wireless (or, although not shown in the example of FIG. 1A, wired) connection with the remaining one of the wireless earbuds 14. Regardless, the smartphone 12 may provide audio data via the wireless connection to the wired earbuds for playback via one or more transducers (such as a speaker) in order to reproduce a soundfield represented by the audio data.

Further, while described in various forms of wireless or wired connection, the smartphone 12 may be coupled to the wireless earbuds 14 in various ways such that communication may occur between the smartphone 12 and the wireless earbuds 14. That is, the term "coupled" as used throughout this disclosure may refer to any form of communication by which information may be exchanged between two devices, including by way of one or more of radio, electromagnetics, induction, light, or any other communication medium.

The smartphone 12 may be wirelessly connected to the wireless earbuds 14 via a Bluetooth™ or other wireless connection, such as a WiFi connection in accordance with Institute of Electrical and Electronic Engineers (IEEE) standards for wireless communication (e.g., IEEE 802.1 a/b/g/n/ac), or some other personal area network (PAN). The smartphone 12 may compress or otherwise encode the audio data prior to transmission via the wireless connection in accordance with Bluetooth™ or some other open or proprietary standard (including AptX™ and/or variations thereof). The wireless earbuds 14 may receive (or, in other words, obtain) the audio data, decode the audio data, and reproduce, based on the audio data, the soundfield represented by the audio data.

The smartphone 12 may host or otherwise support execution of an audible interface. When coupled with the wireless earbuds 14, the smartphone 12 may receive or otherwise obtain audio data representative of one or more spoken commands (which may also be referred to as "audible commands") issued from a user, such as a user 20 shown in the example of FIG. 1B. The user 20 may speak the audible commands and the external and/or user-facing microphones 16/18 may capture audio data representative of the audible commands. The wireless earbuds 14 may transmit or otherwise provide the captured audio data to the smartphone 14, which may perform one or more operations to process the captured audio data and thereby identify the audible commands.

Responsive to the audible commands, the audible interface hosted by the smartphone 12 may perform various operations. For example, the audible interface may perform Internet searches or otherwise access a database to retrieve information requested via the one or more audible commands, converting the retrieved information into response audio data representative of a response to the one or more audible commands. The smartphone may then transmit the response audio data to the wireless earbuds 14, which may output, based on the response audio data, an audible response to the audible commands.

The audible interface may perform, responsive to the audible commands, any number of operations associated with the smartphone 12 and/or the wireless earbuds 14, such as control playback of an audio signal, compose a text message, an email message, a note or other type of message or document, initiate a voice or video call, set, cancel, and/or change an appointment or meeting in a calendar, a timer and/or alarm, control home automation devices (including power plug adapters, connected lights, connected plugs, smart appliances, connected thermostats, or other types of home automation devices), or any other operation associated with the smartphone 12 and/or the wireless earbuds 14.

The smartphone 12 and/or wireless earbuds 14 may operate in a low power or, in other words, a standby state or mode prior to the activation of the audible interface in an effort to reduce power consumption (which may be beneficial as the smartphone 12 and/or wireless earbuds 14 are assumed for purposes of illustration to be powered using a limited power source, such as a battery). In the example of FIG. 1A, the wireless earbuds 14 may only activate a non-zero subset of a number of different microphones of the wireless earbuds 14 to detect a keyword that is used to activate the audible interface in an effort to reduce power consumption in the low power state. The keyword may be selected such that the keyword is distinct and detectable in low resolution audio signal as the subset of microphones may only provide an audio signal in low resolution.

Responsive to detecting the keyword, the wireless earbuds 14 activate the audible interface and potentially enters an active (or other words, high) power state that consumes more power than the low power state. Once in the active power state, the wireless earbuds 14 may configure all or some larger subset of the different microphones to capture, in higher resolution, audio data representative of the one or more audible commands. The wireless device 14 may provide the high resolution audio data to the smartphone 12, which may process the high resolution audio data to identify the one or more audible commands and generate one or more audible responses, which the smartphone 12 may provide to the wireless earbuds 14 to play via one or more transducers (e.g., speakers) or perform any of the other operations noted above.

The wireless device 14 may perform general keyword detection that attempts to detect the keyword using computer models, such as hidden Markov models, which forms the basis of many speech recognition algorithms. However, the wireless device 14 may expend processing power (and associated memory bandwidth and storage space, all of which consume power) in each keyword detection attempt. Further, the wireless device 14 may attempt to reduce unauthorized users from inadvertently or maliciously activating the audible interface to gain access to the smartphone 12 and/or the wireless earbuds 14.

To reduce the ability of unauthorized users from activating the audible interface, the system 10 (which may refer to the smartphone 12 and/or the wireless earbuds 14) may attempt to validate that the user 20 (which represents an authorized user of the smartphone 12 and/or wireless earbuds 14) and not unauthorized users were attempting to activate the audible interface. To validate the user 20, the system 10 may interface with the user 20, prompting the user 20 to say the keyword (and possible multiple times). The system 10 may capture via one or more microphones, e.g., microphones 16, voice audio data representative of the spoken keyword by the user 20. The system 10 may then train, using the voice audio data, one or more models, such as a neural network, deep neural network, or other types of models, so that the one or models detect the specific way in which the user 20 speaks the keyword, which may thereby prevent unauthorized users from speaking the keyword to activate the audible interface of the system 10.

However, the increased security provided by models trained only to detect the keyword as spoken by the user 20 may result in a more complex (in terms of processing cycles expended, memory bandwidth and storage space) process that consumes more power. Further, trained models may struggle to detect the keyword in noisy or other conditions, or may fail to validate the user 20 despite speaking the keyword due to ailments that result in a different voice print or other temporary changes in how the user 20 speaks (e.g., numbing from dental work, injury, etc.).

In accordance with various aspects of the techniques described in this disclosure, the system 10 may differentiate between the user 20 of the system 10 speaking the keyword and any other non-authorized entity (such as a person or another computing device) issuing an audible sound that includes the keyword, thereby potentially eliminating activation of the audible interface by the non-authorized entity. Further, as described in more detail below with respect to the examples of FIGS. 2 and 3, the system 10 may not rely on complicated models trained specifically to the voice signature of the user 20, but may rely on comparisons of various aspects of ear cup audio signal (or, in other words, ear cup audio data) captured by ear cup microphones 16 and external audio signal (or, in other words, external audio data) captured by external microphones 18 and representative of an environment external to the user 20.

As shown in the example of FIG. 1C, there are generally three different types of ear-cup-type components, shown as ear-cup-type components 50A-50C, to which the ear-cup microphones 16 may couple. The ear-cup-type component 50A may represent an ear-insert-type component in which a transducer 52 and ear-cup microphone 16 are inserted into an ear canal 54 of the user 20. The ear-cup-type component 50B may represent an over-ear-cup-type component in which the transducer 52 resides within the ear cup and the ear cup surrounds the ear of the user 20. The ear-cup-type component 50C may represent an on-ear-cup-type component in which the ear cup rests on the ear of the user.

In each of the different ear-cup-type components 50A-50C, ear cup microphone 16 may be facing or directed toward the user 20 within each of ear-cup type components 50A-50C, and as such may be referred to as a "user-facing microphone 16" elsewhere in this disclosure. Further, ear cup microphone 16 may be positioned proximate to the ear canal 54, in each of ear-cup-type components 50A-50C, of the user 20 of the computing device 10. In the example of ear-cup-type components 50A, proximity of the ear cup microphone 16 may be within or internal to the ear canal 54, and as such, ear cup microphone 16 may be referred to as an "internal microphone 16." The ear cup microphone 16 may, as an example of the proximity, be within 3-5 centimeters of the ear canal 54 of the user 20 in each of ear-cup-type components 50B and 50C.

In any event, the system 10 may verify, based on the external audio signal and the ear cup audio signal, that the user 20 activated the audible interface of the computing device. The system 10 may then perform keyword detection with regard to the external audio signal and/or the ear cup audio signal only after verifying that the user 20 activated the audible interface of the computing device, thereby potentially saving power by only expending processing resources to detect the keyword when the user 20 spoke the keyword. Responsive to detecting that the user 20 spoke the keyword, the system 10 may then activate, based on the verification, the additional microphones to obtain high resolution audio signals (or, in other words, high resolution audio data, which may represent additional audio signal or data) representative of the one or more audible commands. More information regarding the smartphone 12 and the wireless earbuds 14 is provided with respect to the examples of FIGS. 2 and 3 respectively.

Figure 2:
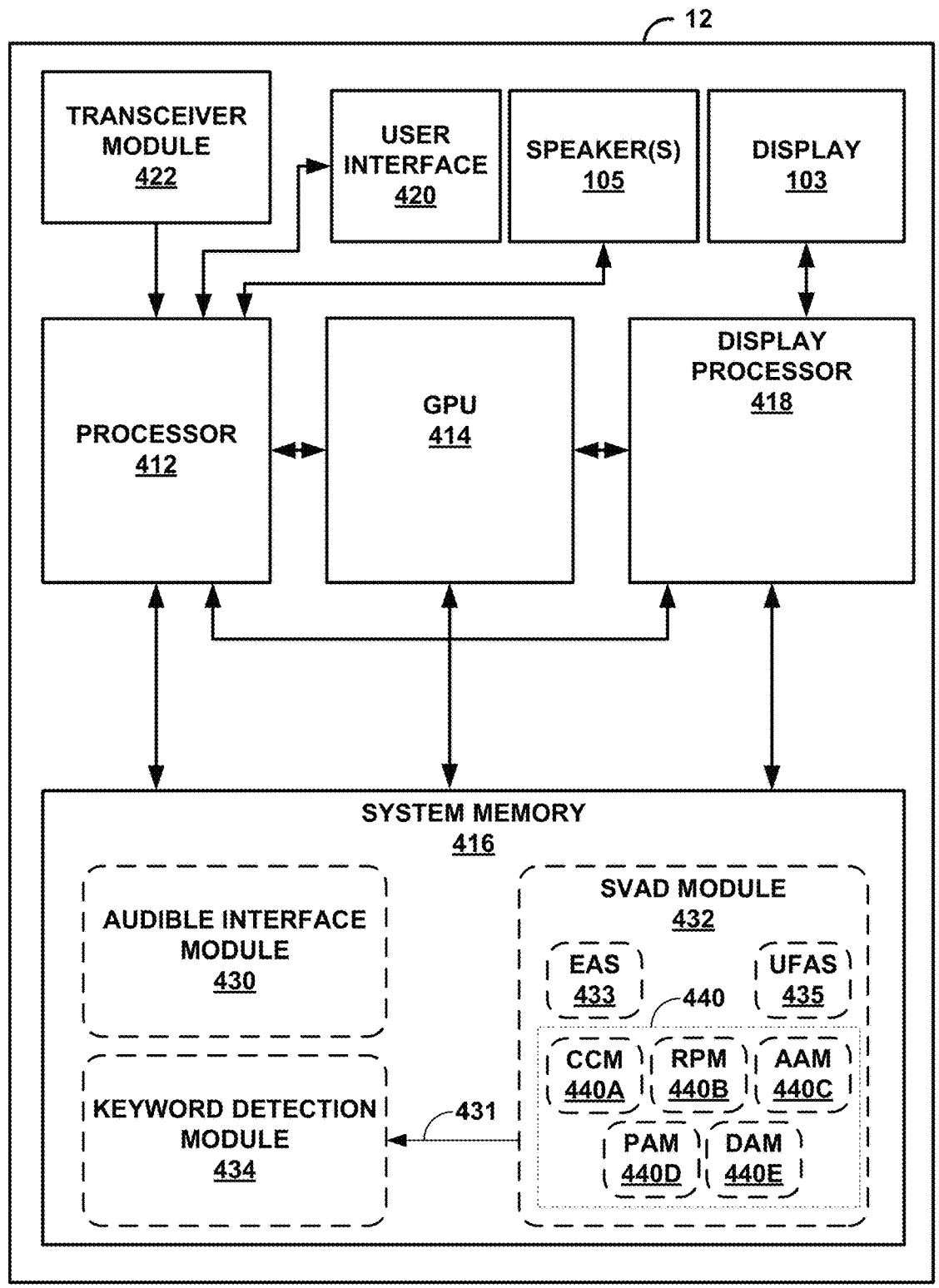
FIG. 2 is a block diagram illustrating example components of the connected computing device shown in the example of FIG. 1A.

FIG. 2 is a block diagram illustrating example components of the connected computing device 12 shown in the example of FIG. 1. In the example of FIG. 2, the source device 2 includes a processor 412, a graphics processing unit (GPU) 414, system memory 416, a display processor 418, one or more integrated speakers 105, a display 103, a user interface 420, and a transceiver module 422. Although described herein with respect to various "modules," it should be understood that various modules may also be referred to as "units," which may comprise instructions (or, in other words, software) stored to a non-transitory computer readable media that, when executed, cause one or more processors (as defined elsewhere in this disclosure), hardware (as defined elsewhere int his disclosure, e.g., as application specific integrated circuits, logical circuits, logical circuitry, circuitry, field programmable gate arrays, etc.), or a combination of hardware and software configured to perform the operations attributed to the modules herein.

In examples where the connected computing device 12 is a mobile device (e.g., the smartphone 12 shown in the example of FIG. 1A), the display processor 418 is a mobile display processor (MDP). In some examples, such as examples where the connected computing device 12 is a mobile device, the processor 412, the GPU 414, and the display processor 418 may be formed as an integrated circuit (IC).

For example, the IC may be considered as a processing chip within a chip package and may be a system-on-chip (SoC). In some examples, two of the processors 412, the GPU 414, and the display processor 418 may be housed together in the same IC and the other in a different integrated circuit (i.e., different chip packages) or all three may be housed in different ICs or on the same IC. However, it may be possible that the processor 412, the GPU 414, and the display processor 418 are all housed in different integrated circuits in examples where the source device 12 is a mobile device.

Examples of the processor 412, the GPU 414, and the display processor 418 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 412 may be the central processing unit (CPU) of the source device 12. In some examples, the GPU 414 may be specialized hardware that includes integrated and/or discrete logic circuitry that provides the GPU 414 with massive parallel processing capabilities suitable for graphics processing. In some instances, GPU 414 may also include general purpose processing capabilities, and may be referred to as a general-purpose GPU (GPGPU) when implementing general purpose processing tasks (i.e., non-graphics related tasks). The display processor 418 may also be specialized integrated circuit hardware that is designed to retrieve image content from the system memory 416, compose the image content into an image frame, and output the image frame to the display 103.

The processor 412 may execute various types of the applications 20. Examples of the applications 20 include web browsers, e-mail applications, spreadsheets, video games, other applications that generate viewable objects for display, or any of the application types listed in more detail above. The system memory 416 may store instructions for execution of the applications 20. The execution of one of the applications 20 on the processor 412 causes the processor 412 to produce graphics data for image content that is to be displayed and the audio data 21 that is to be played (possibly via integrated speaker 105). The processor 412 may transmit graphics data of the image content to the GPU 414 for further processing based on and instructions or commands that the processor 412 transmits to the GPU 414.

The processor 412 may communicate with the GPU 414 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 412 and the GPU 414 may utilize any process, protocol, and/or standard for communication.

The system memory 416 may be the memory for the connected computing device 12. The system memory 416 may comprise one or more computer-readable storage media. Examples of the system memory 416 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 416 may include instructions that cause the processor 412, the GPU 414, and/or the display processor 418 to perform the functions ascribed in this disclosure to the processor 412, the GPU 414, and/or the display processor 418. Accordingly, the system memory 416 may be a computer-readable storage medium having instructions stored thereon that, when executed, cause one or more processors (e.g., the processor 412, the GPU 414, and/or the display processor 418) to perform various functions.

The system memory 416 may include a non-transitory storage medium. The term "non-transitory" indicates that the storage medium is not embodied in a carrier wave or a propagated signal. However, the term "non-transitory" should not be interpreted to mean that the system memory 416 is non-movable or that its contents are static. As one example, the system memory 416 may be removed from the source device 12 and moved to another device. As another example, memory, substantially similar to the system memory 416, may be inserted into the connected computing device 12. In certain examples, a non-transitory storage medium may store data that can, over time, change (e.g., in RAM).

The user interface 420 may represent one or more hardware or virtual (meaning a combination of hardware and software) user interfaces by which a user may interface with the source device 12. The user interface 420 may include physical buttons, switches, toggles, lights or virtual versions thereof. The user interface 420 may also include physical or virtual keyboards, touch interfaces—such as a touchscreen, haptic feedback, and the like.

The processor 412 may include one or more hardware units (including so-called "processing cores") configured to perform all or some portion of the operations discussed above with respect to the smartphone 12. The transceiver module 422 may represent a unit configured to establish and maintain the wireless connection between the connected computing device 12 and the computing device 14. The transceiver module 422 may represent one or more receivers and one or more transmitters capable of wireless communication in accordance with one or more wireless communication protocols.

As shown in the example of FIG. 2, the system memory 416 may store an audible interface module 430, a self-voice activity detection (SVAD) module, and a keyword detection module 434 (when the connected computing device 12 performs SVAD in accordance with various aspects of the voice activation techniques described in this disclosure). Given that the computing device 14 may host the audible interface, perform SVAD, and/or keyword detection instead of the connected computing device 12, the module 430-434 are shown using dashed lines to indicate that the modules 430-434 are optional or in addition to a similar modules 430-434 executed by the computing device 14.

The processor 412 may retrieve instructions represented by the audible interface module 430, the SVAD module 432, and/or the keyword detection module 434 and execute the instructions represented by the audible interface module 430, the SVAD module 432 and/or the keyword detection module 432, which cause the processor 412 to perform one or more of the operations attributed hereafter (for ease of explanation purposes) to the audible interface module 430, the SVAD module 432 and/or the keyword detection module 434. The audible interface module 430 may represent a module configured to receive audio signals representative of one or more audible commands, process the audio signals to identify the audible commands, and perform one or more of the various operations responsive to the audible commands.

In order to determine when to invoke the audible interface module 430, processor 412 may invoke the keyword detection module 434, which may process initial audio signals that may be representative of the keyword. The SVAD module 432 may verify that the user 20 activated the audible interface of the connected computing device 12 prior to providing the initial audio signals to the keyword detection module 434.

In order to verify that the user 20 activated the audible interface of the connected computing device 12, the SVAD module 432 may interface with the computing device 14 (e.g., the wireless earbuds 14 shown in the example of FIG. 1A or some other headset) via the transceiver module 422 to obtain an external audio signal (EAS) 433 and a user-facing audio signal (UFAS) 435. The external microphones 18 shown in FIG. 1A may capture EAS 433, which may represent an environment external to the user 20 associated with the computing device 12. The user-facing microphones 16 that are directed toward the user 20 associated with the computing device 12 may capture the UFAS 435.

Referring back to the example of FIG. 1B, the user 20 may insert the wireless earbuds 14 into an ear, whereupon the user facing microphones 16 (which are not shown as they are inside the ear canal) may sense UFAS 435 as sound is conducted via the bone and flesh of the user 20. The external microphones 18 (where external microphone 18A is shown after wireless earbud 14A has being inserted into the left ear) may capture EAS 433 that represents audio data external to the user 20 (or, in other words, the environment, including sounds spoken by the user 20 as conducted via air surrounding the user 20).

Returning to the example of FIG. 2, the SVAD module 432 may employ various analysis with respect to EAS 433 and UFAS 435 in order to verify that the user 20 spoke the keyword to activate the audible interface hosted by the audible interface module 430. The SVAD module 432 may include one or more verification modules 440 that perform various forms of signal analysis with respect to EAS 433 and UFAS 435 to verify that the user 20 and not an unauthorized user spoke the keyword used to activate the audible interface module 430.

As shown in the example of FIG. 2, the verification modules 440 includes coherence measure model 440A, a relative phase module (RPM) 440B, an amplitude analysis module (AAM0440C, a power analysis module (PAM) 440D, and a direction of arrival module (DAM) 440E. Although shown as including five different modules 440, the keyword detection module 430 may employ only one or a non-zero subset of the verification modules 440.

In any event, the CCM 440A may represent a unit configured to obtain, based on EAS 433 and UFAS 435, a coherence measure representative of a relationship between the EAS 433 and the UFAS 435. More information regarding coherence and how to obtain a coherence measure can be found in Signal Processing Course materials, by William D. Penny, in Chapter 7, Section 7.4.2, starting on page 94, which is available online at www.fil.ion.ucl.ac.uk/~wpenny/course/course.html RPM 440B may represent a unit configured to obtain, based on a left channel and a right channel of either or both of the EAS 433 and the UFAS 435, a relative phase. More information regarding relative phase and ways by which to obtain the relative phase can be found in the above noted Signal Processing Course materials, by William D. Penny, in Chapter 7, Section 7.4.2, starting on page 94.

AAM 440C may represent a unit configured to obtain an amplitude of the EAS 433 and an amplitude of the UFAS 435. AAM 440C may compare the amplitude of the EAS 433 to the amplitude of the UFAS 435 to obtain an amplitude comparison measure. PAM 440D may represent a unit configured to obtain a power of the EAS 433 and a power of the UFAS 435. PAM 440D may compare the power of the EAS 433 to the power of the UFAS 435 to obtain a power comparison measure. DAM 440E may represent a unit configured to obtain, based on EAS 433, a direction of arrival.

The SVAD module 432 may then verify, based on one or more of the coherence measure, the relative phase, the amplitude comparison measure, the power comparison measure, and/or the direction of arrival, that the user 20 activated the audible interface presented by the audible interface module 430 rather than an unauthorized user (which may also be referred to as a "third talker." As such, the SVAD module 432 may represent one or more models trained to distinguish between differences in the above analysis results (the coherence measure, the relative phase, the amplitude comparison measure, the power comparison measure, and/or the direction of arrival) for the EAS 433 and/or UFAS 435.

In this respect, the SVAD module 432 may use inter-channel (between external microphones 18 and user-facing microphones 16) phase and intensity differences as qualifying features to discriminate between own speech and external sound. In other words, using the external microphones 18 and user-facing microphones 16 may allow the SVAD module 432 to avoid activating more than one headset running keywork activation and the following voice command with the same keyword at the same time.

To facilitate understanding of how these different analysis results may result in verification without performing a voice print analysis with respect to either EAS 433 or UFAS 435, consider the following examples shown in FIGS. 4A-4J.

FIGS. 4A-4J are diagrams illustrating graphs that visually demonstrate the differences in analysis results between external audio signals and user-facing audio signals upon which one or more potentially less processor intensive models may be trained to identify in accordance with various aspects of the techniques described in this disclosure. Referring first to the example of FIG. 4A, graph 200A-1 shows the UFAS 435 for three separate use cases 202A-202C. Graph 200A-2 shows the EAS 433 for the same three separate use cases 202A-202C.

During the first phase 202A, the user 20 has spoken the keyword without any other unauthorized user (which is another way to refer to the shown "$3^{rd}$ Talker"). UFAS 435 has, during the first phase 202A, a greater amplitude than the EAS 433, as the human body transmits sounds more efficiently than the air around the user 20. The SVAD module 432 may include one or more models trained to differentiate between the amplitudes of the UFAS 435 and the EAS 433.

During the second phase 202B, the unauthorized user has spoken the keyword without the user 20 speaking the keyword. UFAS 435 has, during the second phase 202B, a much lower amplitude than the EAS 433, as the sound from the unauthorized user did not originate from the vocal cords of the user 20, which vibrates the head of the user 20 when the user 20 speaks thereby conveying the sound to the user facing microphones 16. Again, the SVAD module 432 may include one or more models trained to differentiate between the amplitudes of the UFAS 435 and the EAS 433.

During the third phase 202C, both the user 20 and the unauthorized user speak the keyword. UFAS 435 has less power compared to the power of the EAS (where power may represent a total amount of energy during the third phase 202C), as the externally spoken keyword by the unauthorized user does not produce as much energy at the user-facing microphone (which is also shown as the "internal microphone") 16. Once again, the SVAD module 432 may include one or more models trained to differentiate between the powers of the UFAS 435 and the EAS 433.

Figure 4A:
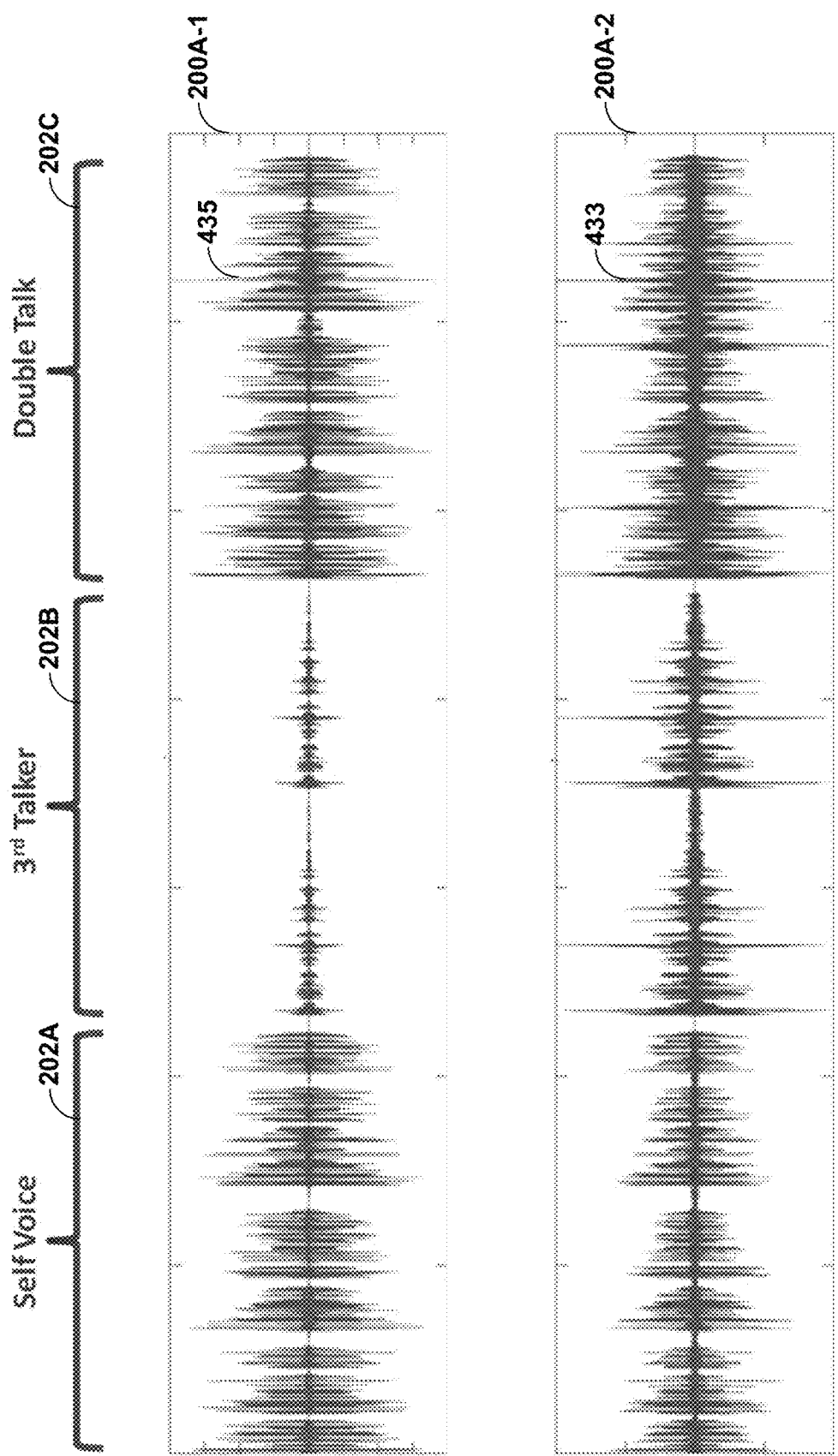
FIGS. 4A-4J are diagrams illustrating graphs that visually demonstrate the differences in analysis results between external audio signals and user-facing audio signals upon which one or more potentially less processor intensive models may be trained to identify in accordance with various aspects of the techniques described in this disclosure.
Figure 4B:
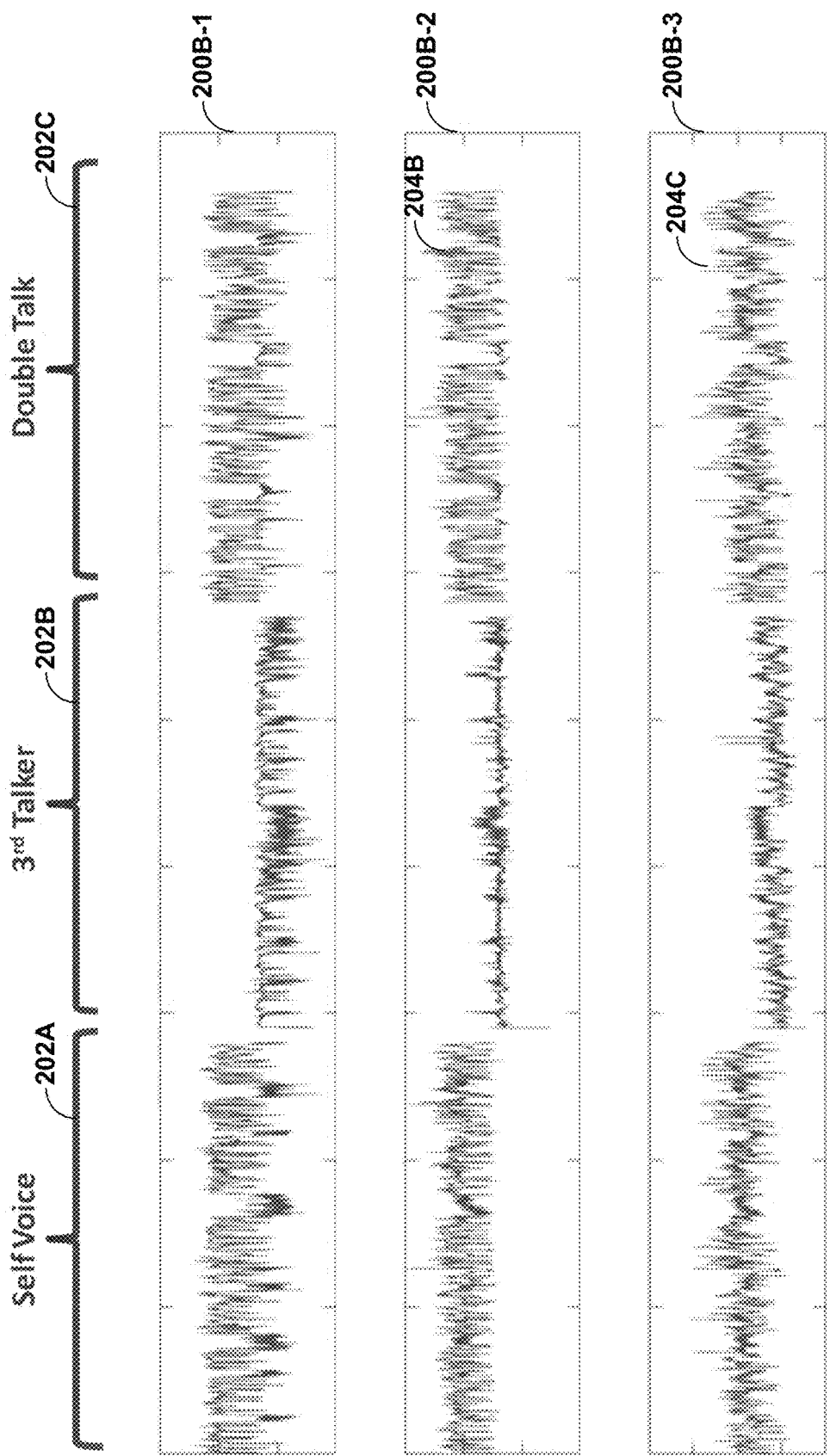

Referring next to the example of FIG. 4B, graphs 200B-1, 200B-2, and 200B-3 show interaural intensity differences (IIDs) 204A, 204B, and 204C, respectively. AAM 440C may compute the amplitude difference between the left and right channels (when microphones 16 and 18 are on both sides of the computing device 14) of EAS 433 and/or UFAS 435 as IIDs at different frequencies. Graph 200B-1 shows IIDs 204A computed for the 250 Hertz (Hz) frequency. Graph 200B-2 shows IIDs 204B computed for the 750 Hz frequency. Graph 200B-3 shows IIDs 204C computed for the 1.25 kilo-Hz (kHz) frequency.

During the first phase 202A, the IIDs 204A-204C ("IIDs 204") have a larger amplitude difference for all three frequencies compared to the second phase 202B. During the third phase 202C, the amplitude differences of IIDs 204 remain high, providing a clear distinction to instances in which only the unauthorized user has spoken the keyword without the user 20 speaking the keyword. The SVAD module 432 may also include one or more models trained to differentiate between the IIDs.

Figure 4C:
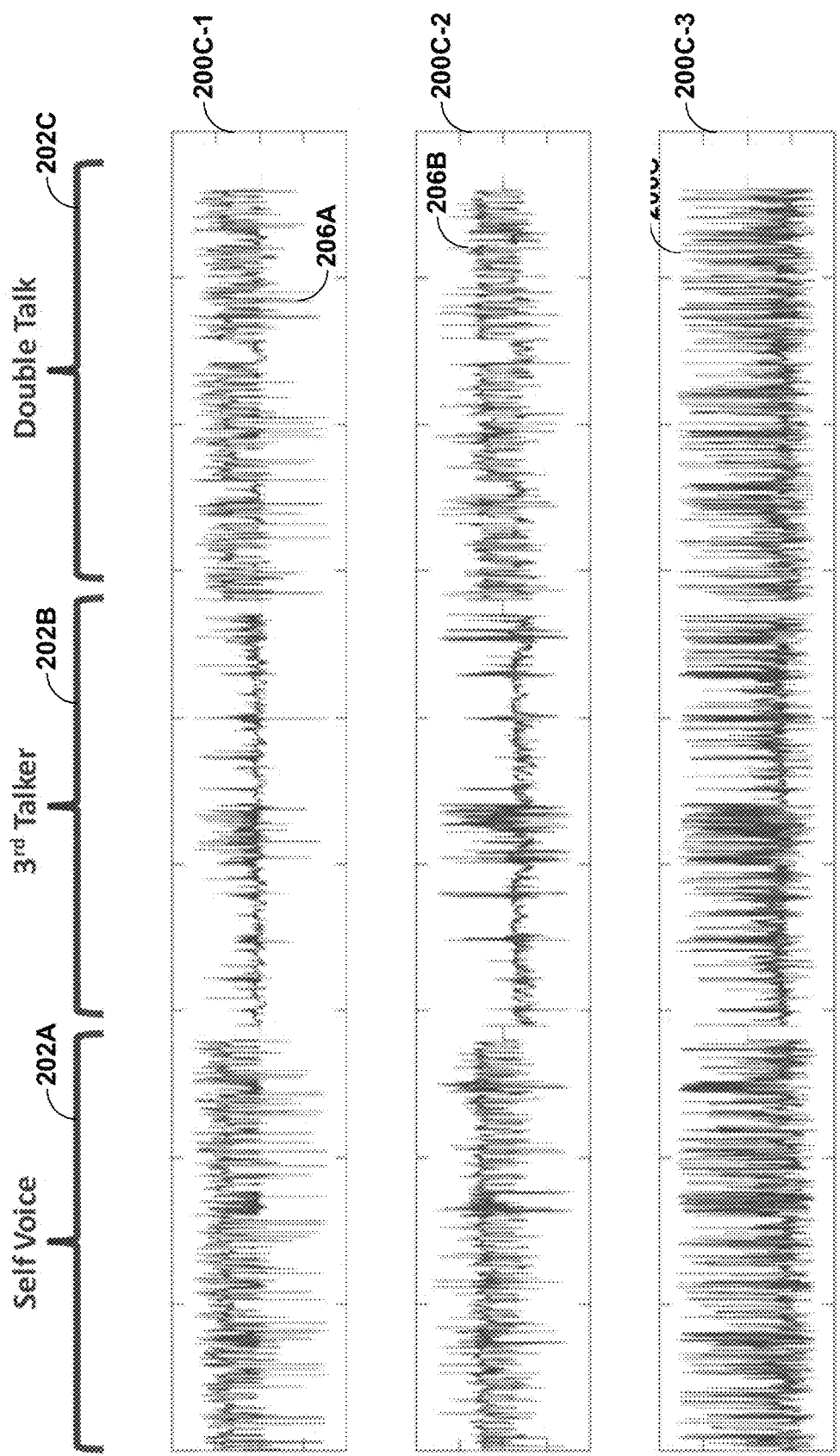

In the example of FIG. 4C, graphs 200C-1, 200C-2, and 200C-3 show interaural phase differences (IPD) 206A, 206B, and 206C, respectively. RPM 440B may compute the phase difference between the left and right channels (when microphones 16 and 18 are on both sides of the computing device 14) of EAS 433 and/or UFAS 435 as IPDs at different frequencies. Graph 200C-1 shows IPDs 206A computed for center frequencies of the 250 Hertz (Hz) frequency. Graph 200C-2 shows IPDs 206B computed for center frequencies of the 750 Hz frequency. Graph 200C-3 shows IPDs 206C computed for center frequencies of the 1.25 kHz frequency.

During the first phase 202A, the IPDs 206A-206C ("IPDs 206") have a larger phase difference for all three frequencies compared to the second phase 202B. During the third phase 202C, the amplitude differences of the IPDs 206 remain high, providing a clear distinction to instances in which only the unauthorized user has spoken the keyword without the user 20 speaking the keyword. The SVAD module 432 may also include one or more models trained to differentiate between the IPDs.

Figure 4D:
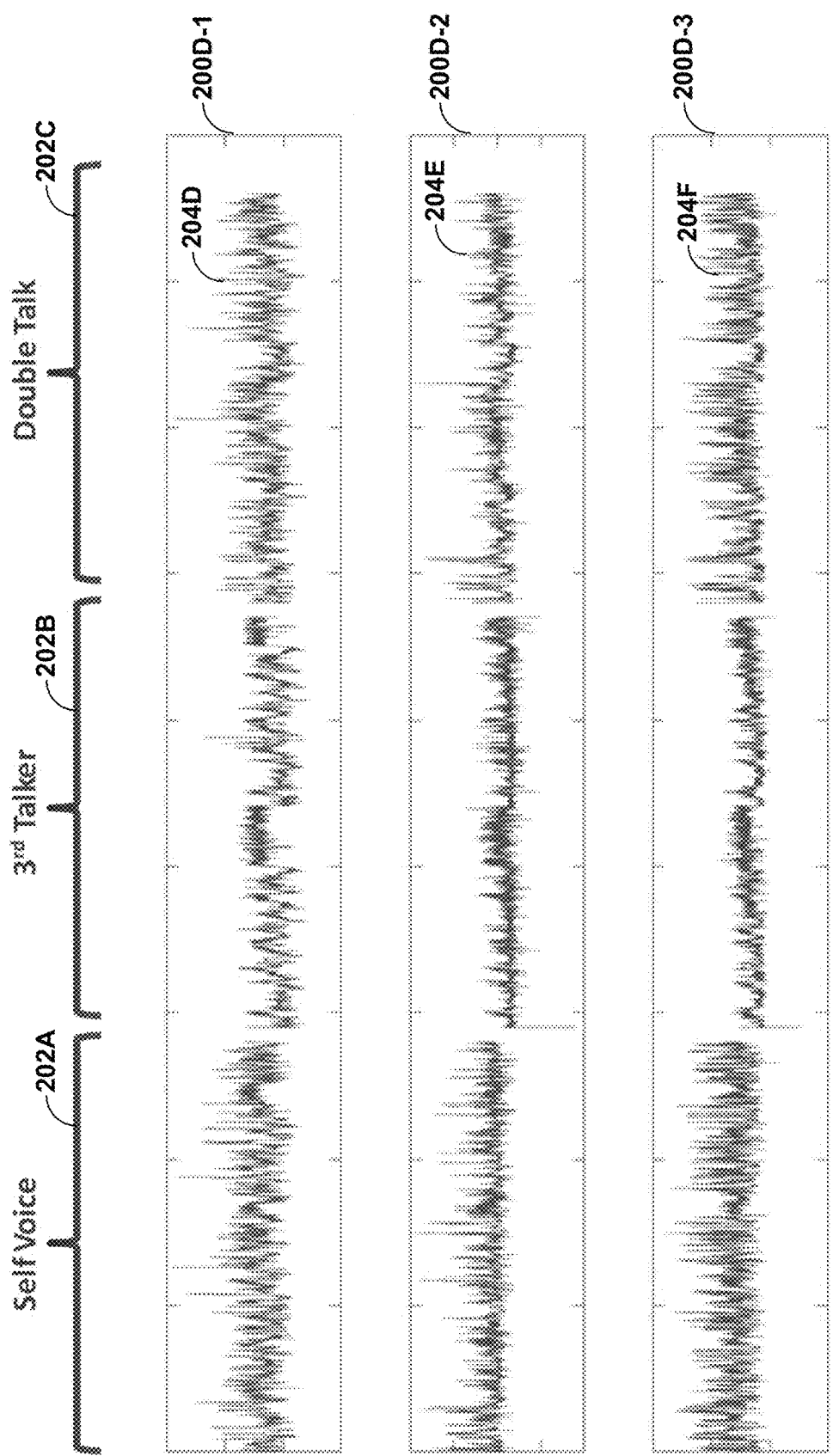

Referring next to the example of FIG. 4D, graphs 200D-1, 200D-2, and 200D-3 show IIDs 204D, 204E, and 204F, respectively. AAM 440C may compute the amplitude difference between the left and right channels (when microphones 16 and 18 are on both sides of the computing device 14) of EAS 433 and/or UFAS 435 as IIDs 204D-204F at different frequencies. Graph 200D-1 shows IIDs 204D computed at center frequencies of a 1.75 kHz frequency. Graph 200D-2 shows IIDs 204E computed at center frequencies of a 2.75 kHz frequency. Graph 200D-3 shows IIDs 204F computed at center frequencies of a 3.75 kHz frequency.

During the first phase 202A, the IIDs 204D-204F have a larger amplitude difference for all three frequencies compared to the second phase 202B. During the third phase 202C, the amplitude differences of IIDs 204D-204F remain high, providing a distinction to instances in which only the unauthorized user has spoken the keyword without the user 20 speaking the keyword. However, comparing IIDs 204A-204C to IIDs 204D-204F, the lower frequency IIDs 204A-204C may better distinguish between self activation and unauthorized activations. The SVAD module 432 may therefore weight the IIDs 204A-204C more in the IID trained models compared to the IIDs 204D-204F.

Figure 4E:
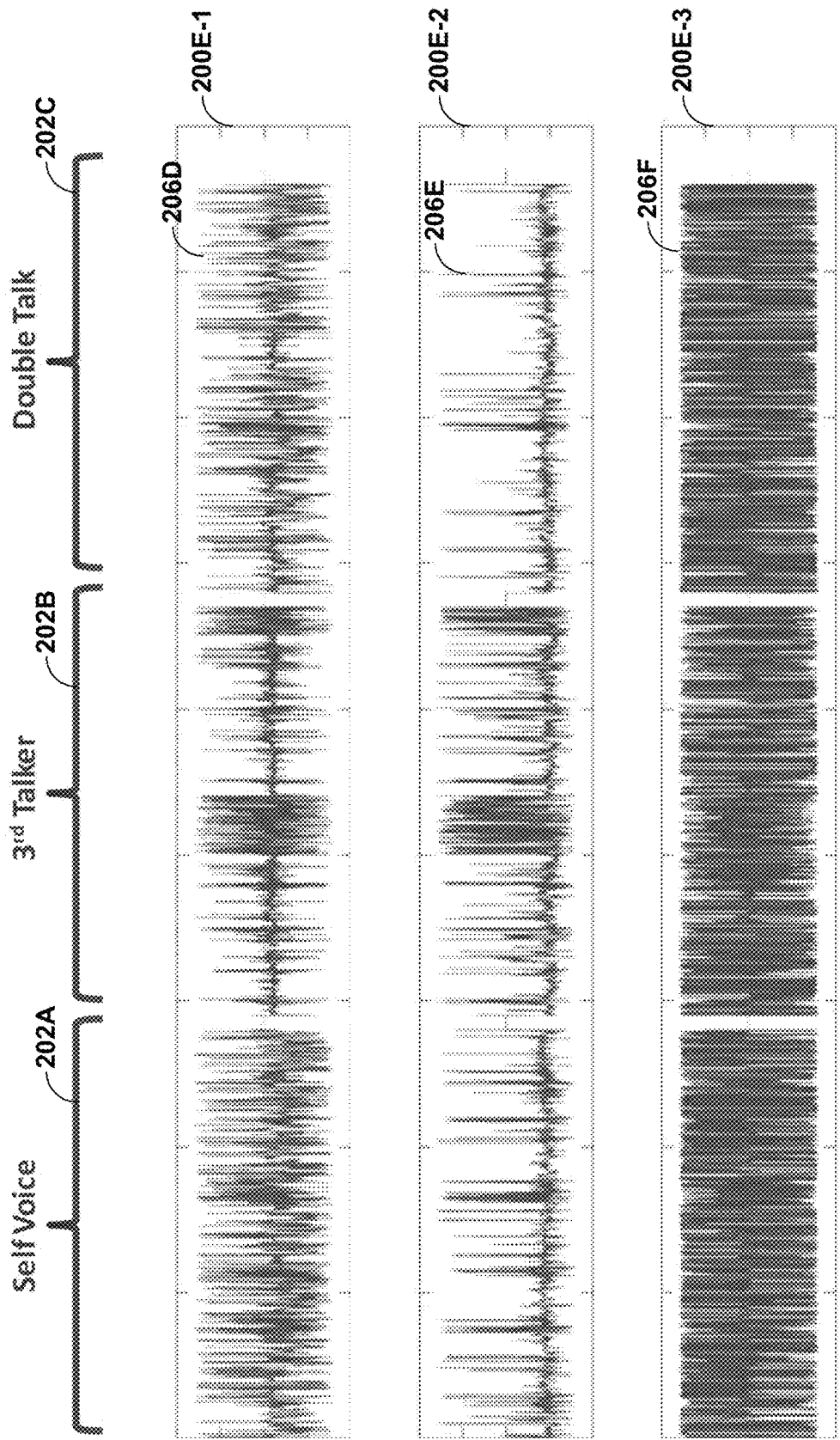

Referring next to the example of FIG. 4E, graphs 200E-1, 200E-2, and 200E-3 show IPDs 206D, 206E, and 206F, respectively. RPM 440B may compute the phase difference between the left and right channels (when microphones 16 and 18 are on both sides of the computing device 14) of EAS 433 and/or UFAS 435 as IPDs 206D-206F at different frequencies. Graph 200E-1 shows IPD 206D computed at center frequencies of a 1.75 kHz frequency. Graph 200E-2 shows IPDs 206E computed at center frequencies of a 2.75 kHz frequency. Graph 200E-3 shows IPDs 206F computed at center frequencies of a 3.75 kHz frequency.

During the first phase 202A, the IPDs 206D-206F have a different envelope for all three frequencies compared to the second phase 202B. During the third phase 202C, the phase differences of IIDs 20^D-206F remain high, providing a distinction to instances in which only the unauthorized user has spoken the keyword without the user 20 speaking the keyword. However, comparing IPDs 206A-206C to IPDs 206D-206F, the lower frequency IPDs 206A-206C may better distinguish between self activation and unauthorized activations. The SVAD module 432 may therefore weight the IPDs 206A-206C more in the IPD trained models compared to the IPDs 206D-206F.

The SVAD module 432 may, rather than include separate models, form a composite measure based on one or more of the amplitudes, phases, etc. The SVAD module 432 may then train, based on the composite measure, a single model that outputs a value of one when the user 20 activates the audible interface, a value of zero when the unauthorized user activates the audible interface, and a value of negative one when neither the user 20 or the unauthorized user attempts to activate the audible interface.

Figure 4F:
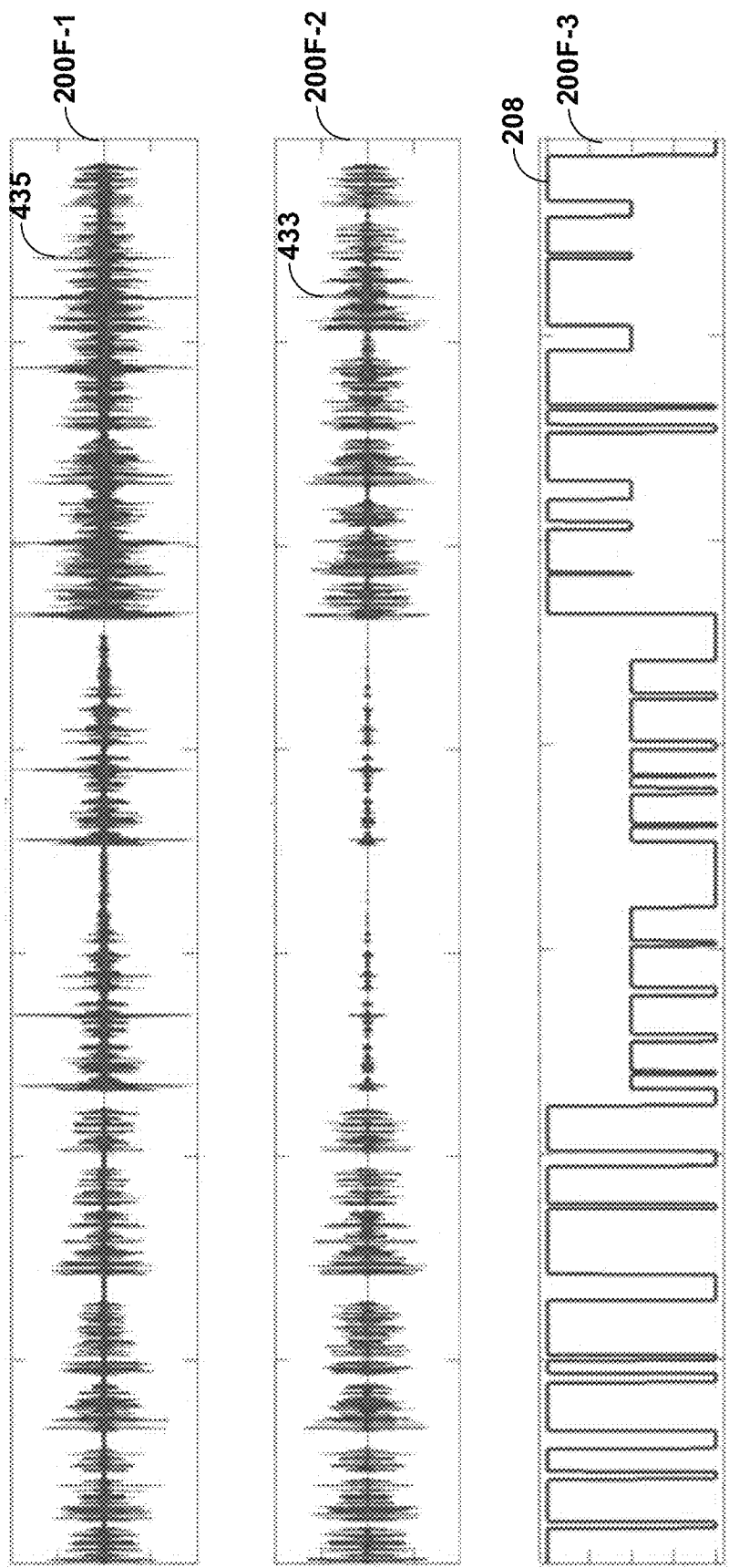

In the example of FIG. 4F, a graph 200E-1 shows the EAS 435, while a graph 200E-2 shows the UFAS 433. A graph 200E-3 shows an output 208 of the single model of the SVAD 432, which causes the processor 402 to activate, when the output 208 is a value of one, the keyword detection module 434.

Figure 4G:
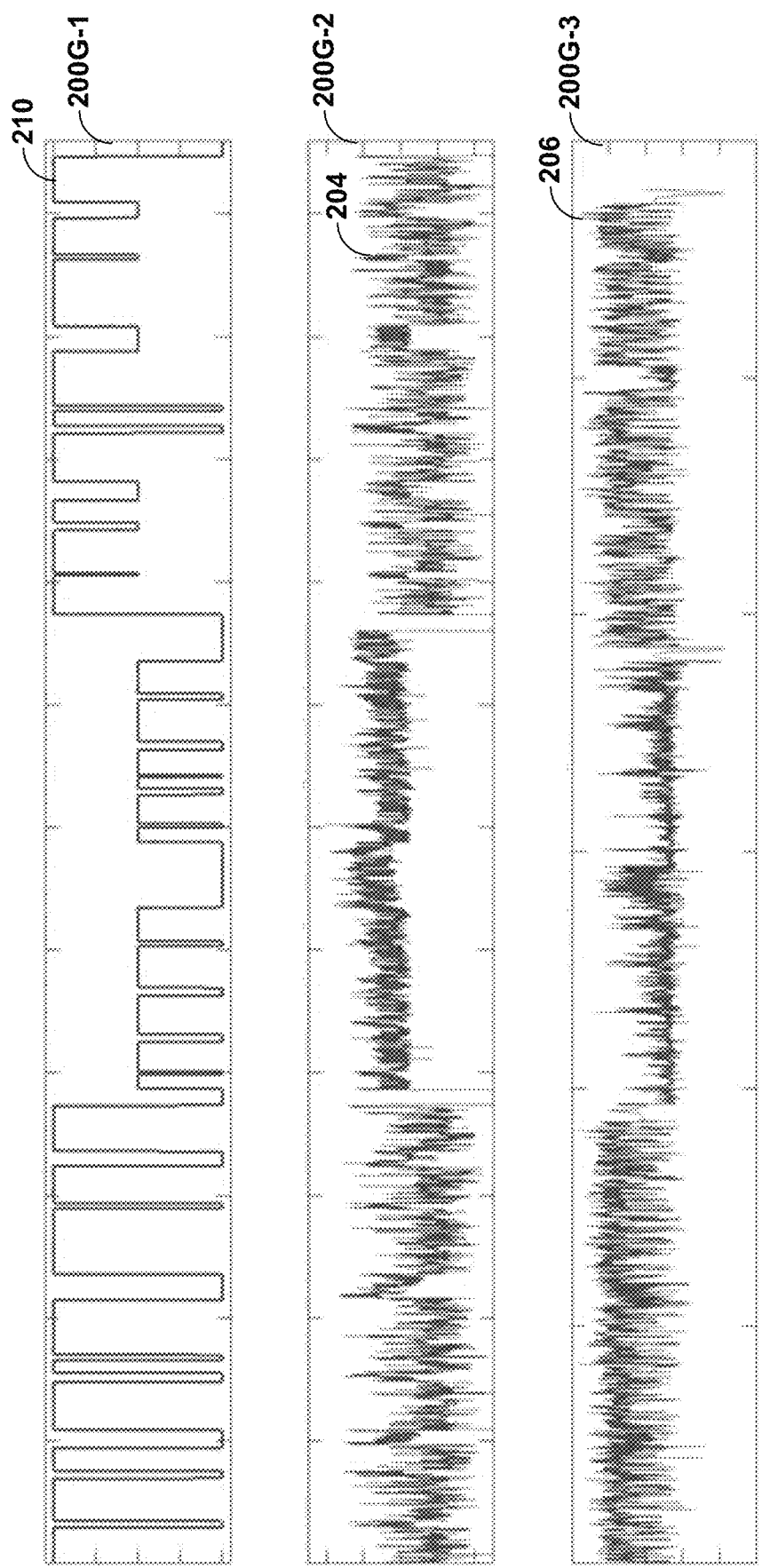

The SVAD module 432 may alternatively have a single model trained for analyzing the EAS 433 and the UFAS 435 and another model trained for analyzing IIDs 204 and IPDs 206. In the example of FIG. 4G, a graph 200G-1 shows an output 210, which output similar values to that of the above noted model that produced the output 208, of the second model trained using select frequencies of the IIDs 204 and select frequencies of the IPDs 206.

Figure 4H:
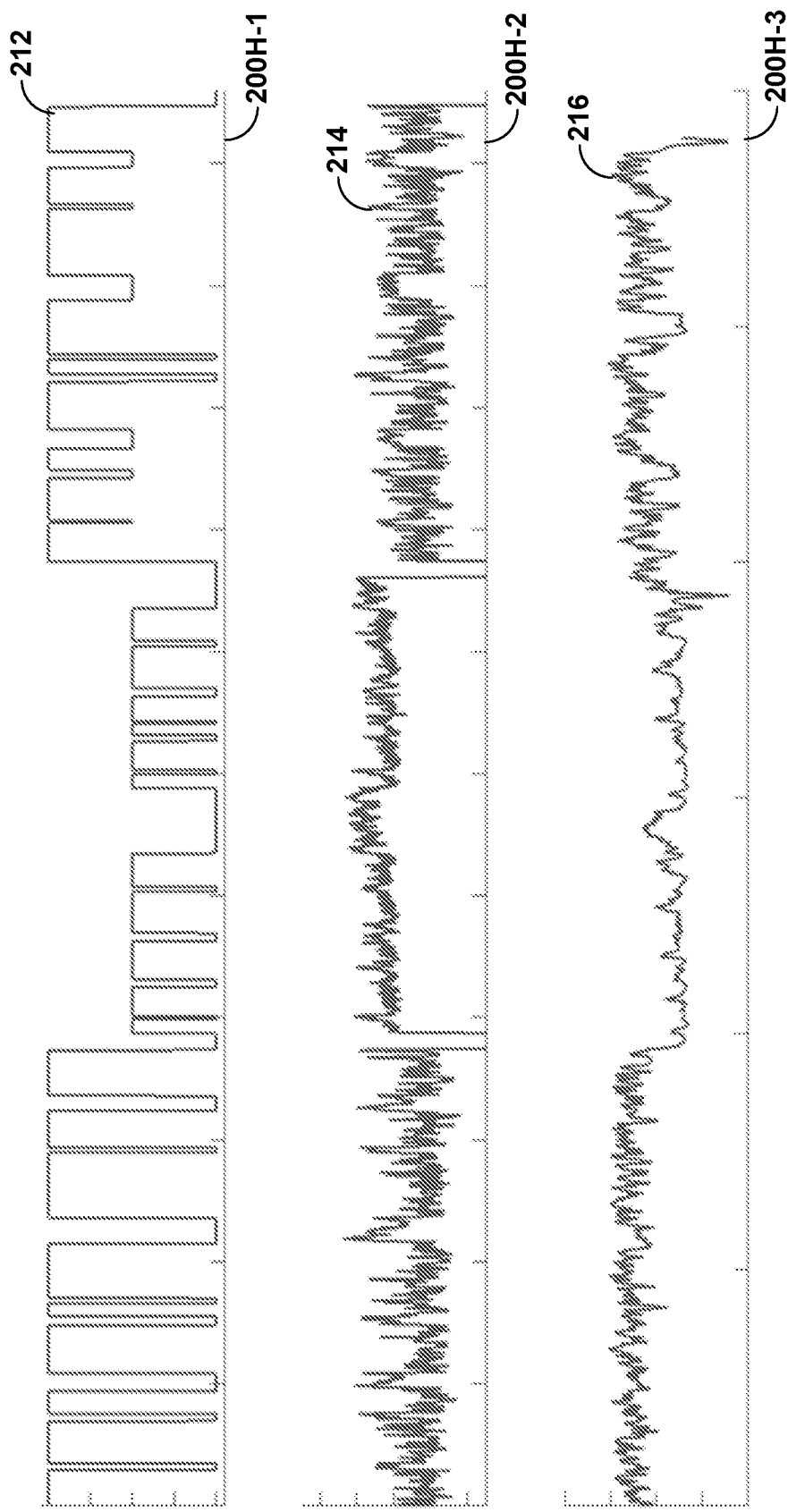

Referring next to the example of FIG. 4H, graphs 200H-1, 200H-2, and 200H-3 show similar results to respective graphs 200G-1, 200G-2, and 200G-3, except that the second model is trained using a running average of the IIDs 204 and a running average of the IPDs 206 resulting in running average signal 214 for the IIDs 204 and running average signal 216 for the IPDs 206. This trained model may produce output 212 with similar values to those discussed above with respect to outputs 208 and 210.

Figure 4I:
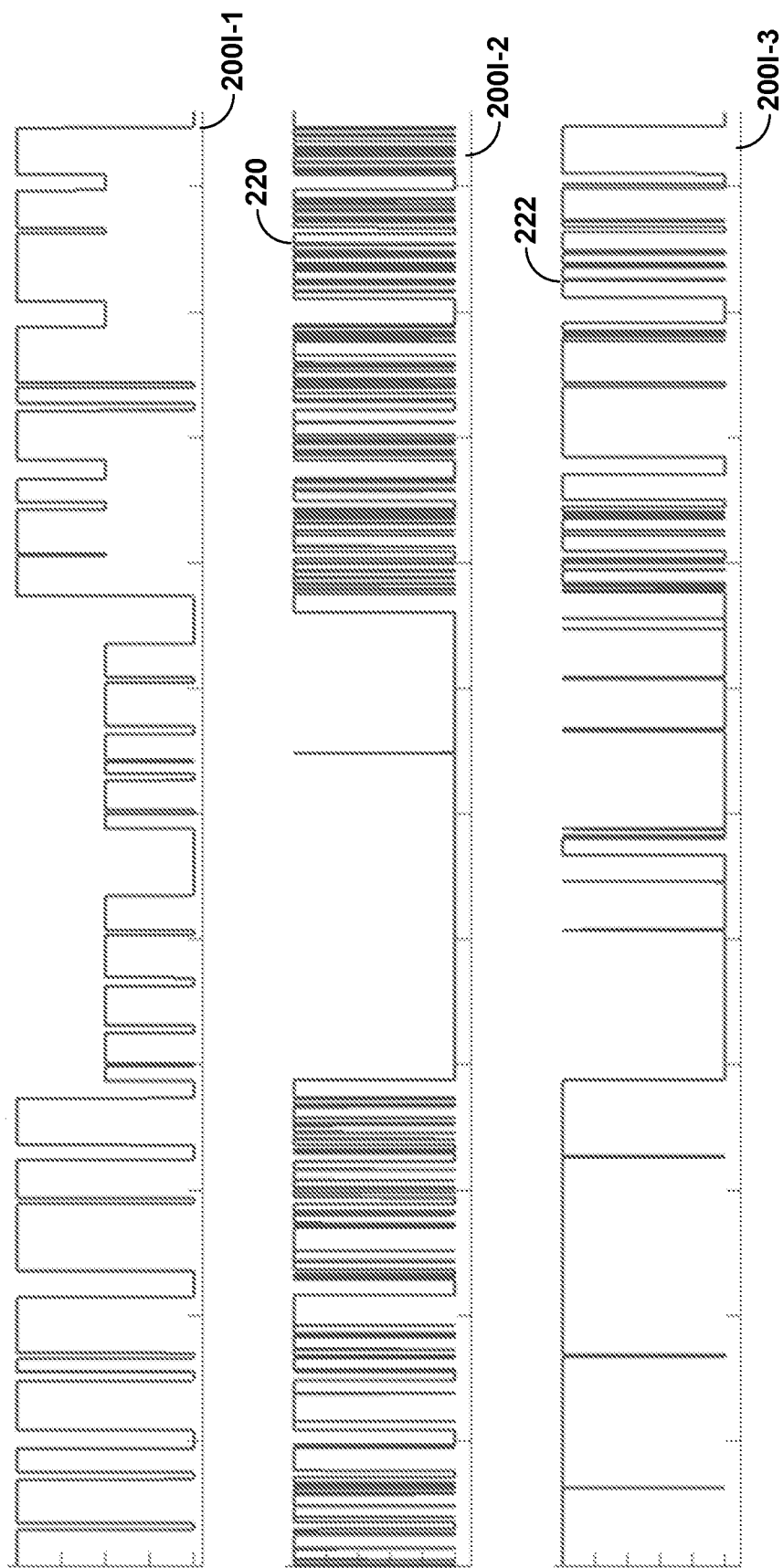

In the example of FIG. 4I, a graph 200I-1 shows the previous model output (e.g., output 208) for reference. A graph 200I-2 shows output 220 of a model that only uses IIDs 204. A graph 200I-3 shows output 222 of a model that only uses IPDs 206. Examining outputs 220 and 222 results in a potential conclusion that the model trained to detect differences in the IIDs 204 is more effective than the model trained to detect differences in the IPDs 206 because there are less false positives of the user 20 speaking the keyword during the second phase (from about sample 4000 to sample 7750).

Figure 4J:
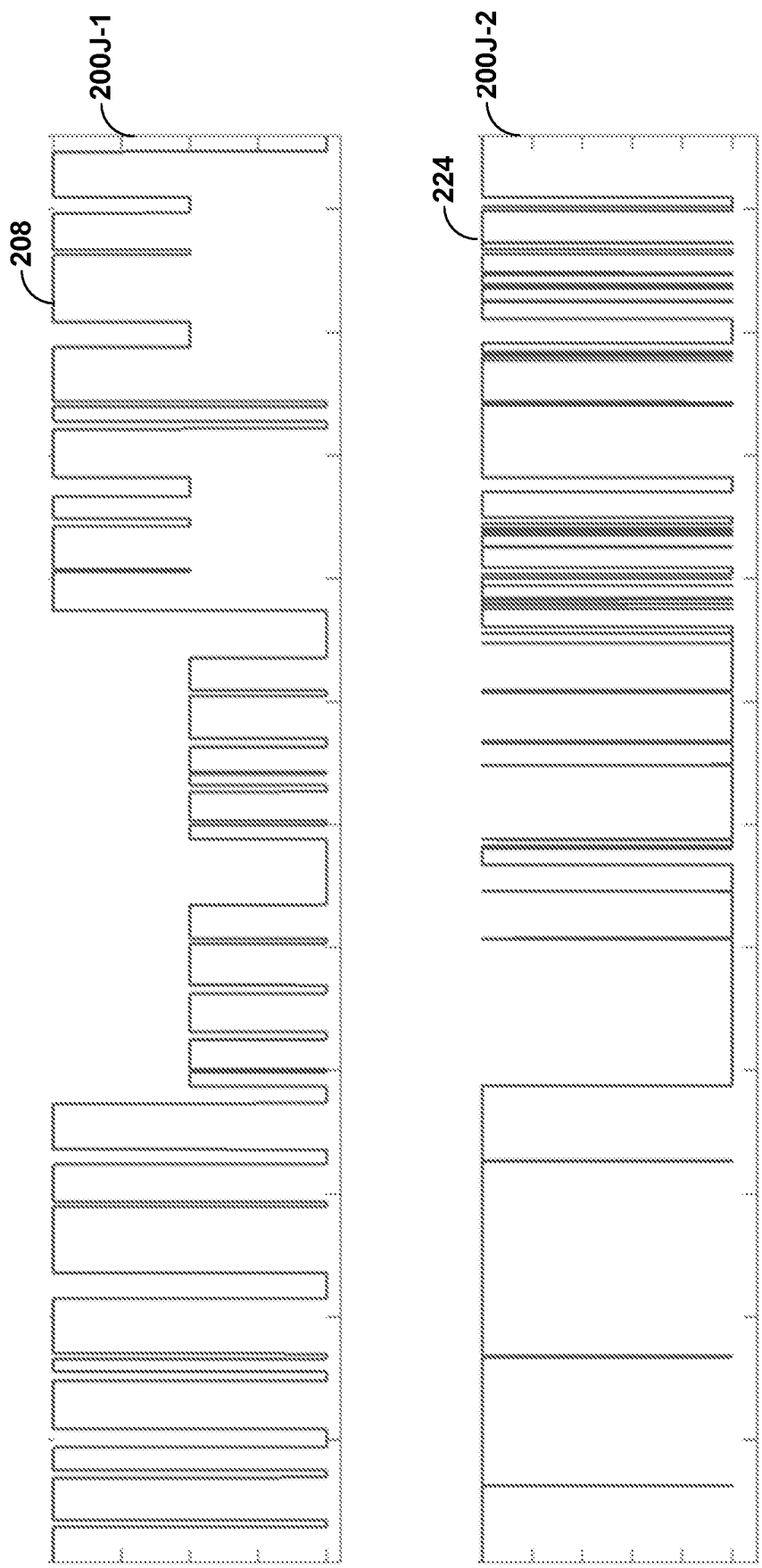

In the example of FIG. 4J, a graph 200J-1 shows the previous model output (e.g., output 208) for reference. A graph 200J-2 shows a logical OR of the output 208 and the IID-IPD model output 220/222 resulting in output 224.

In this respect, the SVAD module 432 may represent one or more trained models that distinguish between any combination of the analysis results to output a signal 431 to the keyword detection module 434 (such as output signal 208, 220, 222, or 224). Responsive to the signal 431, the keyword detection module 434 may perform keyword detection with respect to the EAS 433 and/or UFAS 435. Upon detecting the keyword, the keyword detection module 434 may invoke the audible interface module 430 to present the audible interface. The audible interface module 430 may then process additional audio data representative of the audible commands in the manner discussed above.

Figure 3:
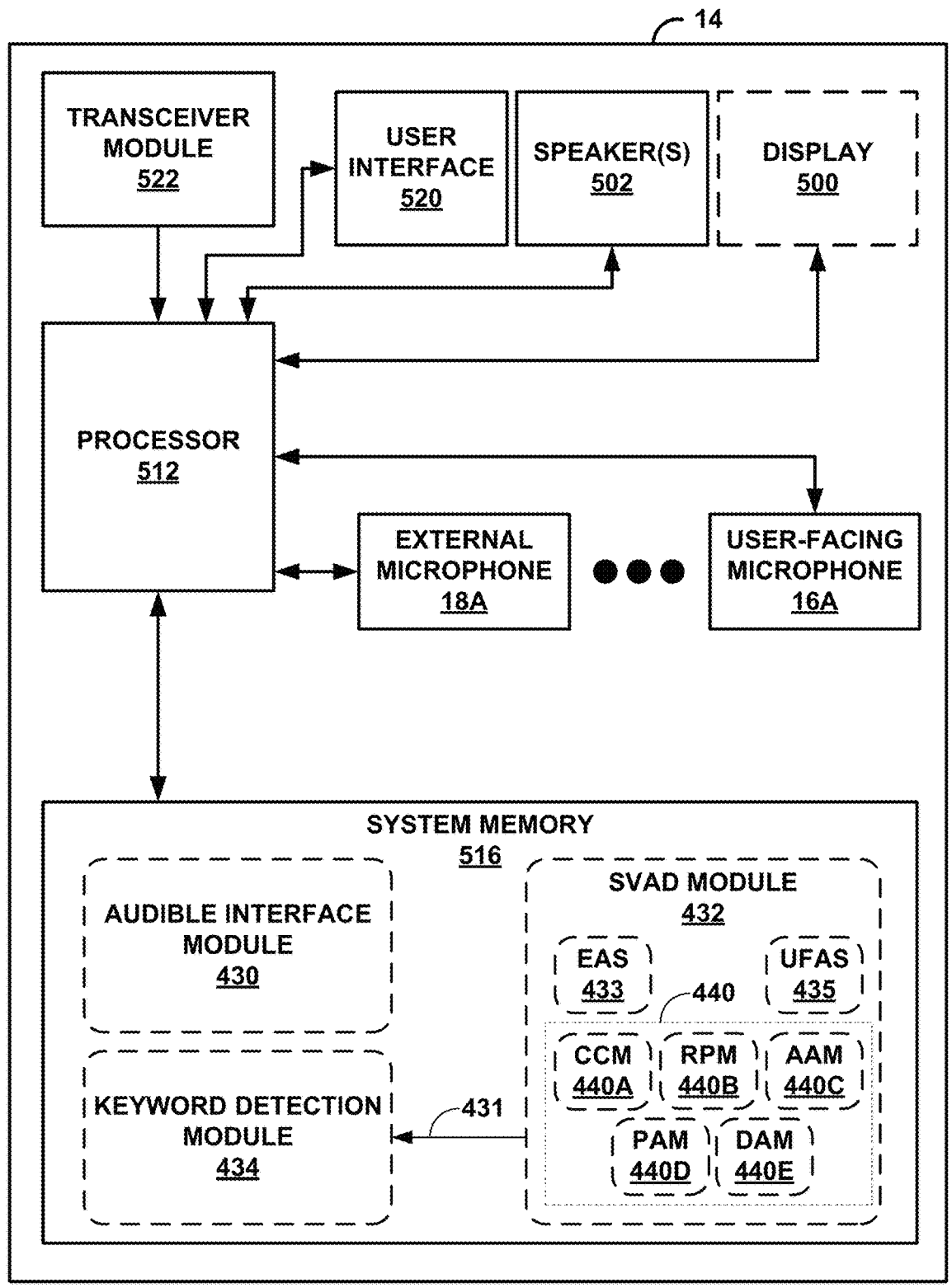
FIG. 3 is a block diagram illustrating example components of the computing device also shown in the example of FIG. 1A.

FIG. 3 is a block diagram illustrating exemplary components of the sink device 14 shown in the example of FIG. 1.

Although the computing device 14 may include components similar to that of the connected computing device 12 discussed above in more detail with respect to the example of FIG. 2, the computing device 14 may, in certain instances, include only a subset of the components discussed above with respect to the connected computing device 12.

In the example of FIG. 3, the computing device 14 includes one or more speakers 502, a processor 512, a system memory 516, a user interface 520, a transceiver module 522, and the above noted user-facing microphone 16A and the external microphone 18A. The processor 512 may be similar or substantially similar to the processor 412. In some instances, the processor 512 may differ from the processor 412 in terms of total processing capacity or may be tailored for low power consumption. The system memory 516 may be similar or substantially similar to the system memory 416. The speakers 502, the user interface 520, and the transceiver module 522 may be similar to or substantially similar to the respective speakers 402, user interface 420, and transceiver module 422. The sink device 14 may also optionally include a display 500, although the display 500 may represent a low power, low resolution (potentially a black and white LED) display by which to communicate limited information, which may be driven directly by the processor 512.

The processor 512 may include one or more hardware units (including so-called "processing cores") configured to perform all or some portion of the operations discussed above with respect to the audible interface module 430, the SVAD module 432, and/or the keyword detection module 434. The transceiver module 522 may represent a unit configured to establish and maintain the wireless connection between the source device 12 and the sink device 14. The transceiver module 522 may represent one or more receivers and one or more transmitters capable of wireless communication in accordance with one or more wireless communication protocols. The transceiver module 522 may maintain the wireless connection to the connected computing device 12.

Given that the computing device 12 may host the audible interface, perform SVAD, and/or keyword detection instead of the connected computing device 14, the module 430-434 are shown using dashed lines to indicate that the modules 430-434 are optional or in addition to a similar modules 430-434 executed by the computing device 14. The modules 430-434 stored to the system memory 516 may operate similar and possibly substantially similar to the modules 430-434 discussed above with respect to the computing device 12 shown in the example of FIG. 2.

As such, the SVAD module 432 executed by processor 512 may obtain, from external microphone 18A, the EAS 433 and obtain, from the user-facing microphone 16A, the UFAS 435 and perform any of the above processes to obtain the signal 431. The SVAD module 432 may output the signal 431 to the keyword detection module 434, which upon detecting the keyword in one or more of the EAS 433 and/or the UFAS 435, invoke the audible interface module 430 to present the audible interface via the computing device 12 as an audible output via the speakers 502.

When the audible interface is hosted by the connected computing device 12, the audible interface module 430 executed by the processor 512 may implement an application programming interface (API) by which to communicate the additional audio data back to the connected computing device 12. The audible interface module 430 may interact with the transceiver module 522 to output the additional audio data to the audible interface. The transceiver module 522 may represent a transceiver configured to transmit the additional audio data (or, in other words, the additional audio signals) to the connected computing device 12.

In some examples, the transceiver module 522 may receive a response audio signal representative of an audible response to the one or more audible commands. The audible interface module 430 may receive, from the transceiver module 522, the response audio signal, and provide the response audio signal to the speakers 502. The speakers 502 may be configured to reproduce, based on the response audio signal, the audible response to the one or more audible commands.

In this and other examples, the audible interface module 430 may process the additional audio signals and obtain the response audio signal without communicating the additional audio signals to the connected computing device 12 (such as when computing device 14 is a standalone device). In these instances, the transceiver module 522 may provide Internet connectivity by which to interface with one or more servers or other data sources by which to obtain the response audio signals. The audible interface module 430 may receive, from the transceiver module 522, the response audio signal, and provide the response audio signal to the speakers 502. The speakers 502 may be configured to reproduce, based on the response audio signal, the audible response to the one or more audible commands.

Figure 5:
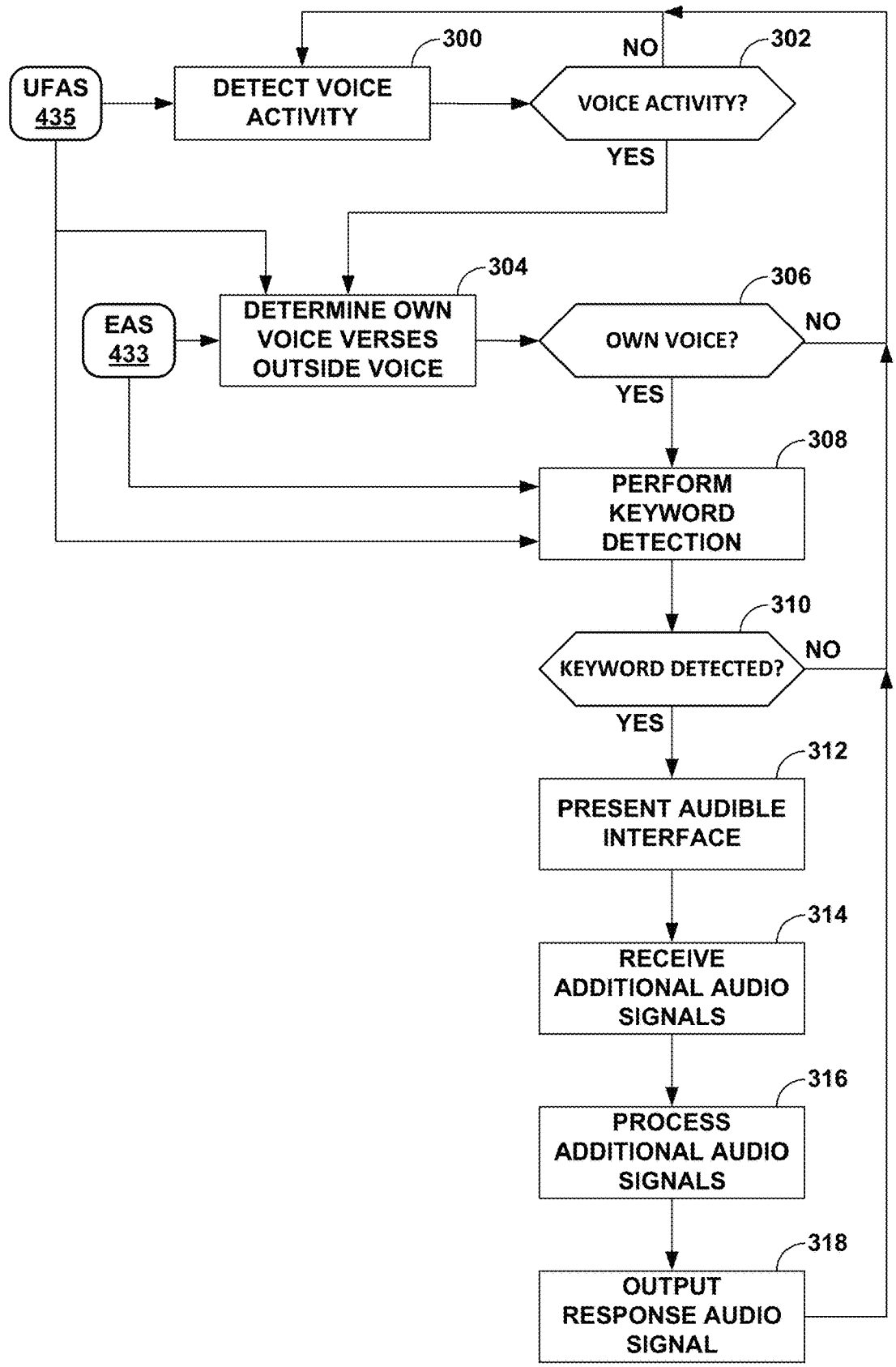
FIG. 5 is a flowchart illustrating example operation of the system shown in the example of FIGS. 1-3 in performing various aspects of the voice activation techniques.

FIG. 5 is a flowchart illustrating example operation of the system shown in the example of FIGS. 1-3 in performing various aspects of the voice activation techniques. In the example of FIG. 5, the system 10 (meaning one or a combination of both the smartphone 12 and the wireless earbuds 14 or other form of in-ear headphones) may receive UFAS 435, whereupon the SVAD module 432 (as either executed by the connected computing device 12 or the wireless earbuds 14) may attempt to detect voice activity (300).

When the SVAD module 432 detects the voice activity ("YES" 302), the SVAD module 432 may determine whether the voice activity is the voice of the user 20 (or, in other words, an own voice) verses an outside voice based on the UFAS 435 and the EAS 433 in the manner described above. When the SVAD module 432 detects that the voice is an own voice ("YES" 306), the SVAD module 432 may invoke the keyword detection module 434. The keyword detection module 434 may analyze the EAS 433 and/or the UFAS 435 to perform keyword detection (308).

When the keyword is detected ("YES" 310), the keyword detection module 434 may invoke the audible interface module 430, which may present the audible interface (312). Via the audible interface, the audible interface module 430 may receive the additional audio signals (314) and process the additional audio signals to obtain the response audio signal (316). The audible interface module 430 may output the response audio signal (318), where the speakers 502 may receive the response audio signal and reproduce, based on the response audio signal, the audible response.

When voice activity is not detected ("NO" 302), the SVAD module 432 continues to analyze the UFAS 435 to detect voice activity (300). When the SVAD module 432 does not determine that the voice activity represents the own voice ("NO" 306), the SVAD module 432 continues to analyze the UFAS 435 to detect voice activity (300). When the keyword detection module 434 does not detect the keyword ("NO" 310), the SVAD module 432 continues to analyze the UFAS 435 to detect voice activity (300). Further, after outputting the response audio signal (318), the SVAD module 432 continues to analyze the UFAS 435 to detect voice activity (300).

Figure 6:
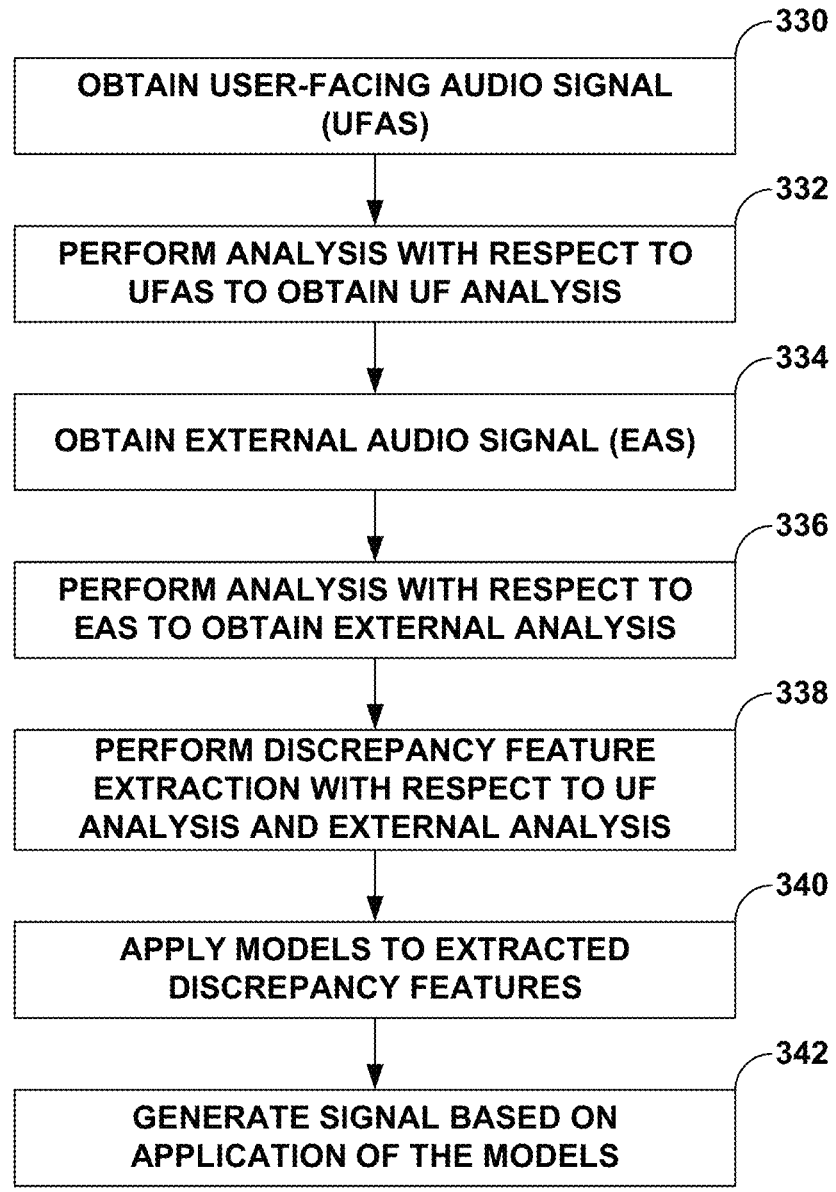
FIG. 6 is a flowchart illustrating example operation of the SVAD module shown in FIGS. 2 and 3 in performing various aspects of the voice activity detection techniques described in this disclosure.

FIG. 6 is a flowchart illustrating example operation of the SVAD module shown in FIGS. 2 and 3 in performing various aspects of the voice activity detection techniques described in this disclosure. The SVAD module 432 may first obtain the UFAS 435 (330), and perform an analysis with respect to the UFAS 435 to obtain UF analysis (332). To perform the analysis with respect to the UFAS 435, the SVAD module 432 may invoke one or more of the validation modules 440. Similarly, the SVAD module 432 may obtain the EAS 433 (334), and perform an analysis (e.g., by invoking one or more of the validation modules 440) with respect to the EAS 433 to obtain external analysis (336). The UF analysis and the external analysis may refer to the analysis results discussed in more detail above.

Next, the SVAD module 432 may condition the analysis results prior to providing the analysis results to the model. That is, the SVAD module 432 may select certain frequencies of the analysis results or otherwise remove certain aspects of the analysis results that are not clearly indicative of a distinction between the user 20 speaking and unauthorized user speaking. In this respect, the SVAD module may perform discrepancy feature extraction with respect to the UF analysis and the external analysis (338).

The SVAD module 432 may apply one or more models to the extracted discrepancy features (e.g., the selected frequencies of the IIDs 204 and the IPDs 206, the amplitudes, powers, direction of arrival, and/or coherence measures) (340). The models may rely on spectral weighting and/or feature combination, where the spectral weights are based on a spectral discrimination importance (which may be preconfigured or learned) while the feature combination is based on thresholding and decisiveness (which again may be preconfigured or learned). The SVAD module 432 may generate (e.g., by combining the output of multiple models) the signal 431 based on the application of the models (342).

Figure 7:
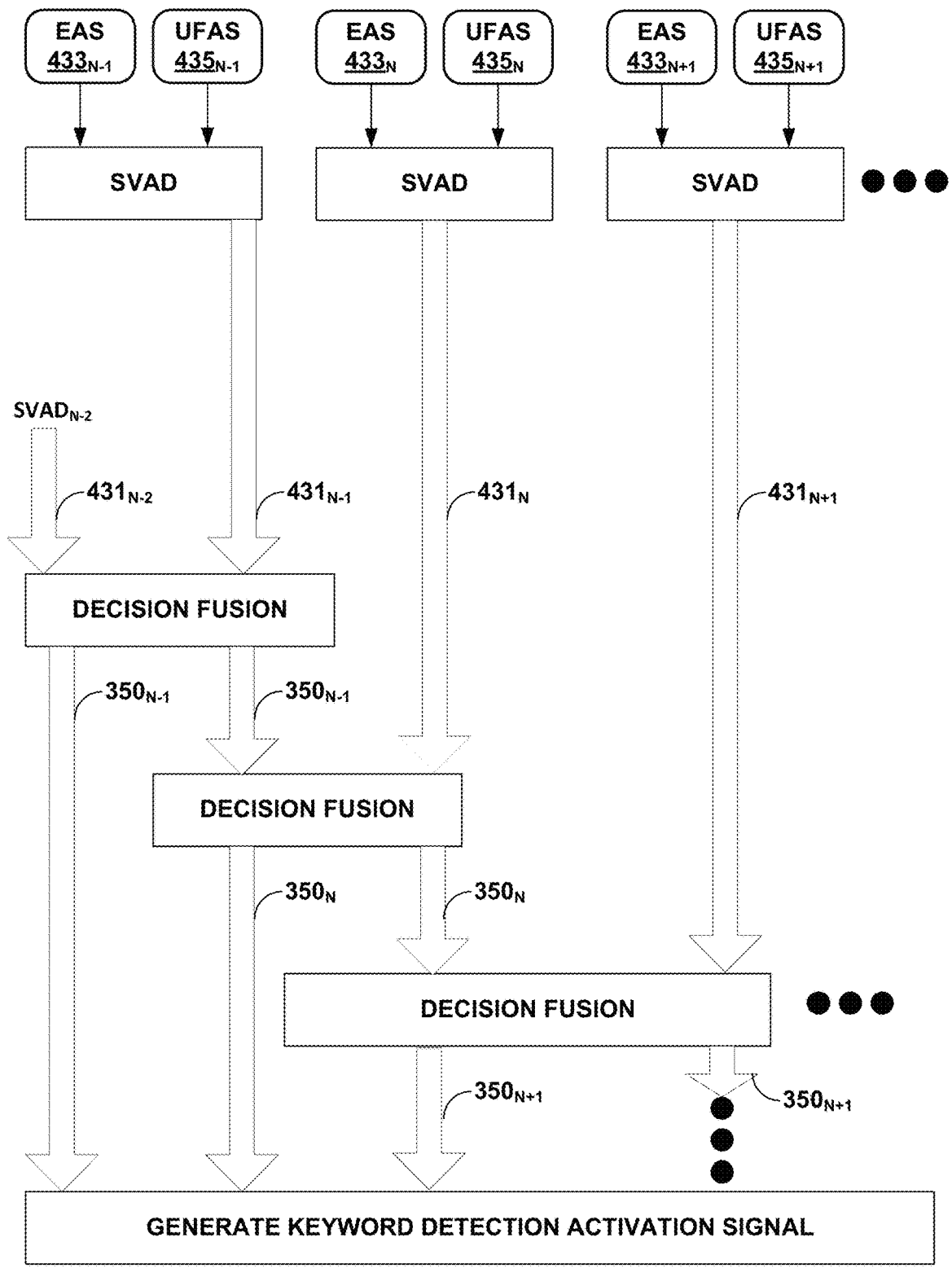
FIG. 7 is a diagram illustrating example operation of the SVAD module 432 shown in the example of FIGS. 2 and 3 in perform time-based aggregation aspects of the voice activity detection techniques.

FIG. 7 is a diagram illustrating example operation of the SVAD module 432 shown in the example of FIGS. 2 and 3 in perform time-based aggregation aspects of the voice activity detection techniques. In the example of FIG. 7, time moves from left to right as denoted by the EAS $433_{N-1}$/UFAS $435_{N-1}$, the EAS $433_N$/UFAS $435_N$, and the EAS $433_{N+1}$/UFAS $435_{N+1}$. The N−1, N, and N+1 refer to samples of the EAS 433 and the UFAS 435 occurring over a time frame from N−1 to N+1.

The SVAD module 432 may perform the SVAD processes described above over time, generating a SVAD signal $431_{N-2}$ at time N−2, a SVAD signal $431_{N-1}$ at time N−1, a SVAD signal $431_N$ at time N, a SVAD signal $431_{N+1}$ at time N+1, and so on. The SVAD module 432 may then perform decision fusion, aggregating the SVAD signal $431_{N-2}$ at time N−2 and the SVAD signal $431_{N-1}$ at time N−1 to provide an aggregate SVAD signal $350_{N-1}$. The SVAD module 432 may then aggregate the aggregate SVAD signal $350_{N-1}$ at time N−1 with the SVAD signal $431_N$ at time N to produce aggregate SVAD signal $350_N$, and so on. The SVAD module 432 may then generate the keyword detection activation signal 431 for time N−1, N, and N+1 based on respective one of the aggregate SVAD signal $350_{N-1}$, the aggregate SVAD signal $350_N$, and the aggregate SVAD signal $350_{N+1}$.

Figure 8A:
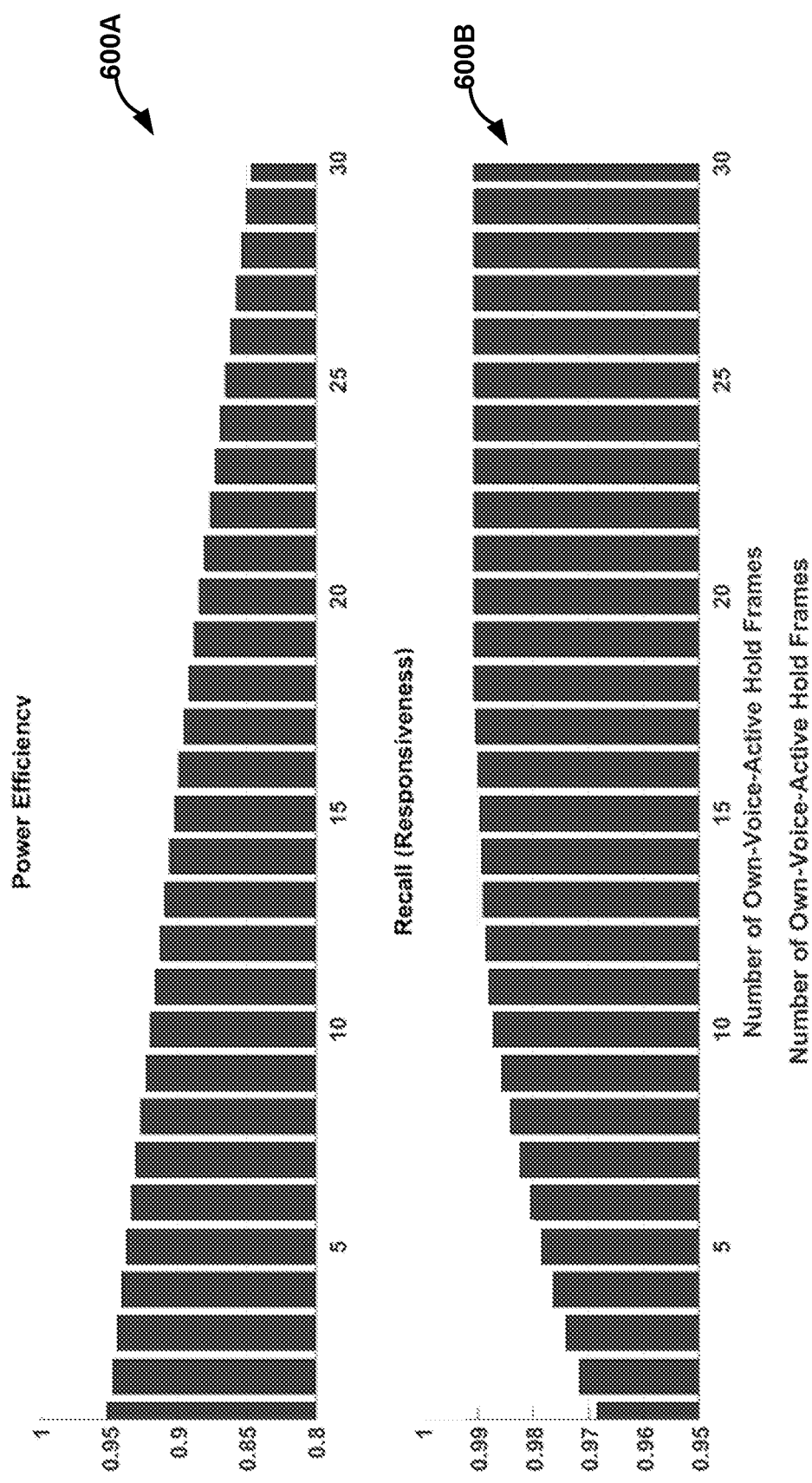
FIGS. 8A and 8B are diagrams illustrating various graphs showing performance of the voice activity detection techniques described in this disclosure.
Figure 8B:
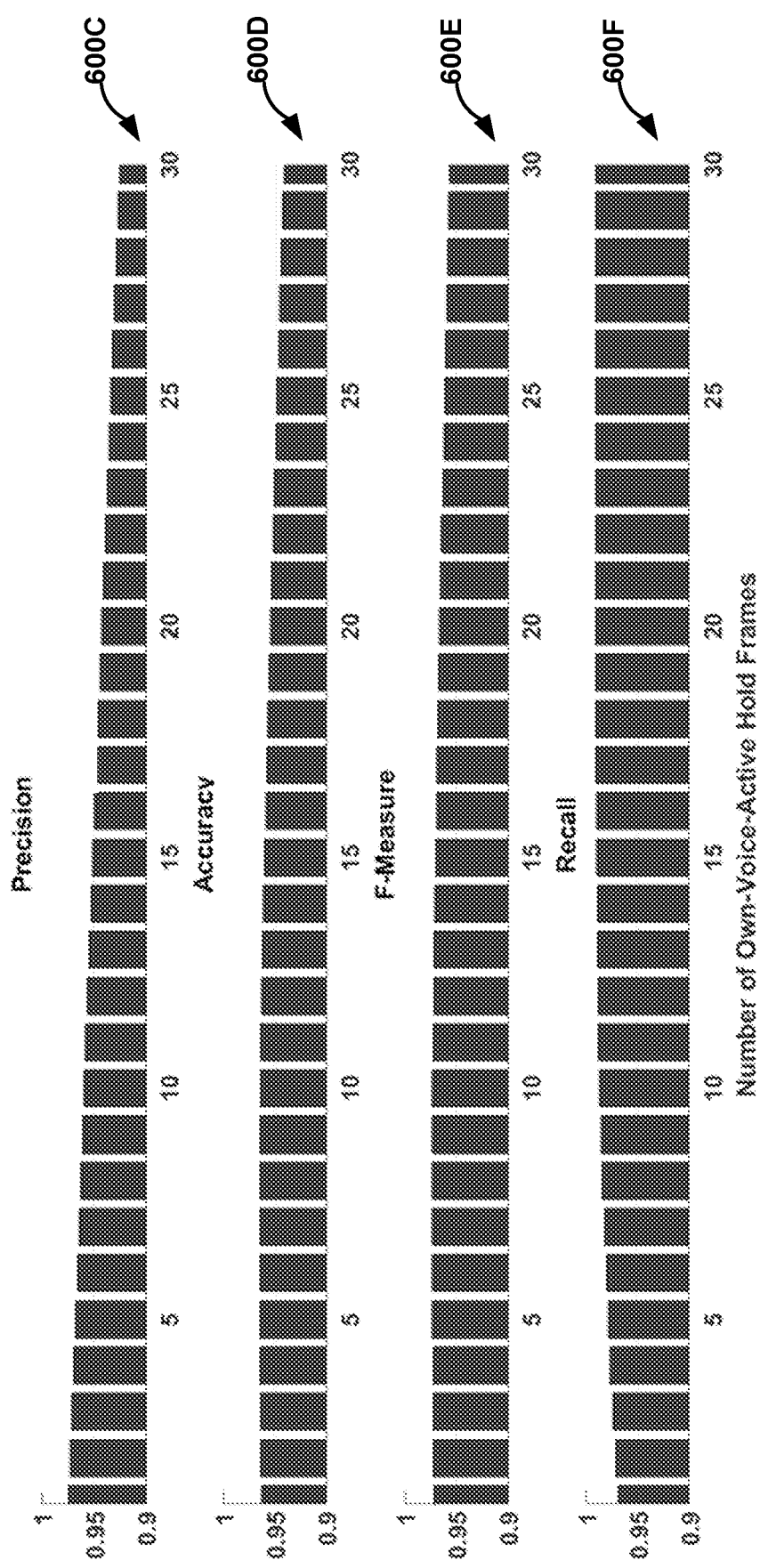

FIGS. 8A and 8B are diagrams illustrating various graphs showing performance of the voice activity detection techniques described in this disclosure. In the example of FIG. 8A, a graph 600A showing power efficiency (with a value of one being completely power efficient) along the Y-axis as a function of the X-axis number of own-voice-active hold frames. From the graph 600A, it is clear that power efficiency goes down as more frames are processed.

A graph 600B, shown also in FIG. 8A, shows recall (which is how fast the SVAD module 432 can correctly detect the own-voice activity, or in other words, responsiveness) with the Y-axis showing a correct detection (with a value of one being always correct) as a function of the number of own-voice-active hold frames. From the graph 600A and 600B, it is clear that the SVAD module 432 should be configured to process approximately 17 own-voice active hold frames to provide a good balance for maximum responsiveness to where the SVAD module 432 reaches over 99%.

In the example of FIG. 8B, a graph 600C shows precision of the SVAD module 432 as a percentage along the Y-axis as a function of the X-axis number of own-voice-active hold frames. A graph 600D shows accuracy of the SVAD module 432 as a percentage along the Y-axis as a function of the X-axis number of own-voice-active hold frames. A graph 600E shows an f-measure of the SVAD module 432 as a percentage along the Y-axis as a function of the X-axis number of own-voice-active hold frames. A graph 600F shows accuracy of the SVAD module 432 as a percentage along the Y-axis as a function of the X-axis number of own-voice-active hold frames.

In terms of evaluating own-voice detection performance, one example evaluation may quantify detection accuracy as well as efficiency by measuring the own versus outside (self versus other) signal discriminatory as a binary classification. The following presents a detection versus misdetection confusion matrix:

$$C = \begin{bmatrix} \text{True Positives } (TP) & \text{False Positives } (FP) \\ \text{False Negatives } (FN) & \text{True Negatives } (TN) \end{bmatrix}$$

$$C = \begin{bmatrix} 5813 & 143 \\ 209 & 3009 \end{bmatrix}, C_V(\%) = \begin{bmatrix} 96.5 & 4.5 \\ 3.5 & 95.5 \end{bmatrix}$$

The foregoing indicates that the own versus outside signal discriminatory is correct about 96.2%.

Further, in designing the SVAD module 432, two measures were defined to quantify the performance and establish a correct detection versus power efficiency balance. The first measure is responsiveness, which refers to the probability that the own voice is detected correctly where the frame is actually an own voice. Responsiveness can be defined as a ratio between a total number of frames where both estimated and actual labels are active and a total number of own-voice-active frames. The second measure is a power saving index, which refers to the probability that the outside signal is identified correctly where own voice is absent. The power saving index may be defined as a ratio between a total number of frames where both estimated and actual labels are non-active and a total number of own-voice-absent frames.

It can be shown that the responsiveness is equivalent to recall rate, where a recall rate may be denoted by the following mathematical equation:

$$\text{Recall} = \frac{TP}{TP + FN}$$

The precision noted above may be obtained using the following mathematical equation:

$$\text{Precision} = \frac{TP}{TP+FP}$$

The correct detection performance as a classification problem can also be considered by measuring the accuracy and the f-measure.

The following are the results (as indicated in graphs 600A-600F):
  Recall: 96.5%
  Precision: 97.6%
  Accuracy: 96.2%
  F-measure: 97.1%
  Power Saving Index: 95.5%
  Recall is still below 100%, meaning there will be over 4% of own voice frames missed and suppressed for voice activation.

Improving recall may result in less power savings thereby resulting in the balance noted above of configuring the SVAD module 432 to process approximately 17 frames.

The foregoing techniques may be performed with respect to any number of different contexts and audio ecosystems. A number of example contexts are described below, although the techniques should be limited to the example contexts. One example audio ecosystem may include audio content, movie studios, music studios, gaming audio studios, channel-based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel-based audio content (e.g., in 2.0, 5.1, and 7.1) such as by using a digital audio workstation (DAW). The music studios may output channel-based audio content (e.g., in 2.0, and 5.1) such as by using a DAW. In either case, the coding engines may receive and encode the channel-based audio content based one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel-based audio content for output by the delivery systems. Another example context in which the techniques may be performed comprises an audio ecosystem that may include broadcast recording audio objects, professional audio systems, consumer on-device capture, high-order ambisonics (HOA) audio format, on-device rendering, consumer audio, TV, and accessories, and car audio systems.

The broadcast recording audio objects, the professional audio systems, and the consumer on-device capture may all code their output using HOA audio format. In this way, the audio content may be coded using the HOA audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.), such as audio playback system 16.

Other examples of context in which the techniques may be performed include an audio ecosystem that may include acquisition elements, and playback elements. The acquisition elements may include wired and/or wireless acquisition devices (e.g., microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a soundfield. For instance, the mobile device may acquire a soundfield via the wired and/or wireless acquisition devices and/or the on-device surround sound capture (e.g., a plurality of microphones integrated into the mobile device). The mobile device may then code the acquired soundfield into various representations for playback by one or more of the playback elements. For instance, a user of the mobile device may record (acquire a soundfield of) a live event (e.g., a meeting, a conference, a play, a concert, etc.), and code the recording into various representation, including higher order ambisonic HOA representations.

The mobile device may also utilize one or more of the playback elements to playback the coded soundfield. For instance, the mobile device may decode the coded soundfield and output a signal to one or more of the playback elements that causes the one or more of the playback elements to recreate the soundfield. As one example, the mobile device may utilize the wireless and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a headset or headphones, e.g., to create realistic binaural sound.

In some examples, a particular mobile device may both acquire a soundfield and playback the same soundfield at a later time. In some examples, the mobile device may acquire a soundfield, encode the soundfield, and transmit the encoded soundfield to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of audio signals. For instance, the one or more DAWs may include audio plugins and/or tools which may be configured to operate with (e.g., work with) one or more game audio systems. In some examples, the game studios may output new stem formats that support audio format. In any case, the game studios may output coded audio content to the rendering engines which may render a soundfield for playback by the delivery systems.

The mobile device may also, in some instances, include a plurality of microphones that are collectively configured to record a soundfield, including 3D soundfields. In other words, the plurality of microphone may have X, Y, Z diversity. In some examples, the mobile device may include a microphone which may be rotated to provide X, Y, Z diversity with respect to one or more other microphones of the mobile device.

A ruggedized video capture device may further be configured to record a soundfield. In some examples, the ruggedized video capture device may be attached to a helmet of a user engaged in an activity. For instance, the ruggedized video capture device may be attached to a helmet of a user whitewater rafting. In this way, the ruggedized video capture device may capture a soundfield that represents the action all around the user (e.g., water crashing behind the user, another rafter speaking in front of the user, etc.).

The techniques may also be performed with respect to an accessory enhanced mobile device, which may be configured to record a soundfield, including a 3D soundfield. In some examples, the mobile device may be similar to the mobile devices discussed above, with the addition of one or more accessories. For instance, a microphone, such as an Eigen microphone (EigenMike®) that represents one or more microphones configured to capture audio data or a combination of audio data and directional information, may be attached to the above noted mobile device to form an accessory enhanced mobile device. In this way, the accessory enhanced mobile device may capture a higher quality version of the soundfield than just using sound capture components integral to the accessory enhanced mobile device.

Example audio playback devices that may perform various aspects of the techniques described in this disclosure are further discussed below. In accordance with one or more techniques of this disclosure, speakers and/or sound bars may be arranged in any arbitrary configuration while still playing back a soundfield, including a 3D soundfield. Moreover, in some examples, headphone playback devices may be coupled to a decoder via either a wired or a wireless connection. In accordance with one or more techniques of this disclosure, a single generic representation of a soundfield may be utilized to render the soundfield on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a soundfield may be utilized to render the soundfield on any of the foregoing playback environments. Additionally, the techniques of this disclosure enable a rendered to render a soundfield from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the soundfield, including 3D soundfields, of the sports game may be acquired (e.g., one or more microphones and/or Eigen microphones (EigenMike®) may be placed in and/or around the baseball stadium). HOA coefficients corresponding to the 3D soundfield may be obtained and transmitted to a decoder, the decoder may reconstruct the 3D soundfield based on the HOA coefficients and output the reconstructed 3D soundfield to a renderer, the renderer may obtain an indication as to the type of playback environment (e.g., headphones), and render the reconstructed 3D soundfield into signals that cause the headphones to output a representation of the 3D soundfield of the sports game.

In each of the various instances described above, it should be understood that the source device 12 may perform a method or otherwise comprise means to perform each step of the method for which the source device 12 is described above as performing. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the source device 12 has been configured to perform.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the sink device 14 may perform a method or otherwise comprise means to perform each step of the method for which the sink device 14 is configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the sink device 14 has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

In this respect, various aspects of the techniques described in this disclosure may enable the following clauses.

Clause 1A. A computing device configured to support an audible interface, the computing device comprising: a memory configured to store a first audio signal representative of an environment external to a user associated with the computing device and a second audio signal sensed by a microphone coupled to a housing of the computing device; and one or more processors configured to: verify, based on the first audio signal and the second audio signal, that the user activated the audible interface of the computing device; and obtain, based on the verification, additional audio signals representative of one or more audible commands.

Clause 2A. The computing device of clause 1A, wherein the one or more processors are configured to: obtain, based on the first audio signal and the second audio signal, a coherence measure representative of a relationship between the first audio signal and the second audio signal; and verify, based on the coherence measure, that the user activated the audible interface of the computing device.

Clause 3A. The computing device of any combination of clauses 1A and 2A, wherein the one or more processors are configured to: obtain, based on a left channel and a right channel of the second audio signal, a relative phase between the left channel and the right channel of the second audio signal; and verify, based on the relative phase, that the user activated the audible interface of the computing device.

Clause 4A. The computing device of any combination of clauses 1A-3A, wherein the one or more processors are configured to: compare an amplitude of the first audio signal and an amplitude of the second audio signal; and verify, based on the comparison of the amplitude of the first audio signal and the amplitude of the second audio signal, that the user activated the audible interface of the computing device.

Clause 5A. The computing device of any combination of clauses 1A-4A, wherein the one or more processors are configured to: compare a power of the first audio signal and a power of the second audio signal; and verify, based on the comparison of the power of the first audio signal and a power of the second audio signal, that the user activated the audible interface of the computing device.

Clause 6A. The computing device of any combination of clauses 1A-5A, wherein the one or more processors are configured to: obtain, based on the first audio signal, a direction of arrival; and verify, based on the direction of arrival and the second audio signal, that the user activated the audible interface of the computing device.

Clause 7A. The computing device of any combination of clauses 1A-6A, wherein the one or more processors are configured to verify, based on the first audio signal and the second audio signal and without performing a voice print analysis with respect to either the first audio signal or the second audio signal, that the user activated the audible interface of the computing device.

Clause 8A. The computing device of any combination of clauses 1A-7A, wherein the one or more processors are configured to verify, based on the first audio signal and the second audio signal, that the user and not an unauthorized entity activated the audible interface of the computing device.

Clause 9A. The computing device of any combination of clauses 1A-8A, wherein the computing device comprises a headset that includes an external microphone configured to capture the first audio signal and the housing to which the microphone is coupled, wherein the one or more processors are configured to obtain, from one or more of the external microphone and the microphone, the additional audio signals representative of the one or more audible commands, and wherein the computing device comprises a transceiver configured to transmit the additional audio signals to a connected computing device.

Clause 10A. The computing device of any combination of clauses 1A-8A, wherein the computing device comprises a headset that includes an external microphone configured to capture the first audio signal, the housing to which the microphone is coupled, and at least one speaker, wherein the one or more processors are configured to obtain, from one or more of the external microphone and the microphone, the additional audio signals representative of the one or more audible commands, wherein the computing device comprises a transceiver configured to: transmit the additional audio signals to a connected computing device; and receive a response audio signal representative of an audible response to the one or more audible commands, and wherein the at least one speaker is configured to reproduce, based on the response audio signal, the audible response to the one or more audible commands.

Clause 11A. The computing device of any combination of clauses 1A-8A, wherein the computing device comprises a headset that includes an external microphone configured to capture the first audio signal, the housing to which the microphone is coupled, and at least one speaker, wherein the one or more processors are configured to activate, based on the verification, the audible interface by which to process the additional audio signals representative of the one or more audible commands to obtain a response audio signal representativev of an audible reponse to the one or more audible commands, and wherein the at least one speaker is configured to reproduce, based on the response audio signal, the audible resopnse to the one or more audible commands.

Clause 12A. The computing device of any combination of clauses 1A-8A, wherein the computing device is communicatively coupled to a headset, and wherein the computing device includes a transciever to receive the first audio signal, the second audio signal, and the additional audio signals, wherein the one or more processors are configured to activate, based on the verification, the audible interface by which to process the additional audio signals representative of the one or more audible commands to obtain a response audio signal representativev of an audible reponse to the one or more audible commands, and wherein the transciever transmits the response audio signal to the headset.

Clause 13A. The computing device of any one of clauses 9A-12A, wherein the headset includes headphones.

Clause 14A. The computing device of any one of clauses 9A-12A, wherein the headset includes wireless headphones wirelessly coupled to the connected computing device.

Clause 15A. The computing device of any one of clauses 9A-14A, wherein the headset includes in-ear headphones.

Clause 16A. The computing device of any combination of clauses 1A-15A, wherein the microphone comprises a user facing microphone directed to the user of the computing device.

Clause 17A. The computing device of any combination of clauses 1A-15A, wherein the microphone comprises a microphone positioned proximate to an ear canal of the user of the computing device.

Clause 18A. The computing device of clause 17A, wherein the microphone positioned proximate to the ear canal comprises a microphone positioned within 3-5 centimeters (cm) of the ear canal of the user of the computing device.

Clause 19A. The computing device of any combination of clauses 1A-18A, wherein the computing device comprises a virtual reality device that includes the housing.

Clause 20A. The computing device of any combination of clauses 1A-18A, wherein the computing device comprises an augmented reality device that includes the housing.

Clause 21A. The computing device of any combination of clauses 1A-18A, wherein the computing device comprises a mixed reality device that includes the housing.

Clause 22A. The computing device of any combination of clauses 1A-18A, wherein the computing device comprises a head mounted display device that includes the housing.

Clause 23A. The computing device of any combinatino of clauses 1A-22A, wherein the housing includes an ear-cup-type component, and wherein the ear-cup-type component includes an over-ear-cup type component, an on-ear-cup-type component, and an in-ear-cup-type component.

Clause 24A. A method of supporting an audible interface, the method comprising: obtaining a first audio signal representative of an environment external to a user associated with a computing device; obtaining a second audio signal sensed by a microphone coupled to a housing; verifying, based on the first audio signal and the second audio signal, that the user activated the audible interface of the computing device; and obtaining, based on the verification, additional audio signals representative of one or more audible commands.

Clause 25A. The method of clause 24A, wherein verifying that the user acted the audible interface comprises: obtaining, based on the first audio signal and the second audio signal, a coherence measure representative of a relationship between the first audio signal and the second audio signal; and verifying, based on the coherence measure, that the user activated the audible interface of the computing device.

Clause 26A. The method of any combination of clauses 24A and 25A, wherein verifying that the user activated the audible interface comprises:obtaining, based on a left channel and a right channel of the second audio signal, a relative phase between the left channel and the right channel of the second audio signal; and verifying, based on the relative phase, that the user activated the audible interface of the computing device.

Clause 27A. The method of any combination of clauses 24A-26A, wherein verifying that the user acted the audible interface comprises: comparing an amplitude of the first audio signal and an amplitude of the second audio signal; and verifying, based on the comparison of the amplitude of the first audio signal and the amplitude of the second audio signal, that the user activated the audible interface of the computing device.

Clause 28A. The method of any combination of clauses 24A-27A, wherein verifying that the user actived the audible interface comprises: comparing a power of the first audio signal and a power of the second audio signal; and verifying, based on the comparison of the power of the first audio signal and a power of the second audio signal, that the user activated the audible interface of the computing device.

Clause 29A. The method of any combination of clauses 24A-28A, wherein verifying that the user actived the audible interface comprises: obtaining, based on the first audio signal, a direction of arrival; and verifying, based on the direction of arrival and the second audio signal, that the user activated the audible interface of the computing device.

Clause 30A. The method of any combination of clauses 24A-29A, wherein verifying that the user actived the audible interface comprises verifying, based on the first audio signal and the second audio signal and without performing a voice print analysis with respect to either the first audio signal or the second audio signal, that the user activated the audible interface of the computing device.

Clause 31A. The method of any combination of clauses 24A-30A, wherein verifying that the user actived the audible interface comprises verifying, based on the first audio signal and the second audio signal, that the user and not an unauthorized entity activated the audible interface of the computing device.

Clause 32A. The method of any combination of clauses 24A-31A, wherein the computing device comprises a headset that includes an external microphone configured to capture the first audio signal and the housing to which the microphone is coupled, wherein obtaining the additional audio signals comprises obtaining, from one or more of the external microphone and the microphone, the additional audio signals representative of the one or more audible commands, and wherein the method further comprises transmitting the additional audio signals to a connected computing device.

Clause 33A. The method of any combination of clauses 24A-31A, wherein the computing device comprises a headset that includes an external microphone configured to capture the first audio signal, the housing to which the microphone is coupled, and at least one speaker, wherein obtaining the additional audio signals comprises obtaining, from one or more of the external microphone and the microphone, the additional audio signals representative of the one or more audible commands, wherein the method further comprises: transmitting the additional audio signals to a connected computing device; and receiving a response audio signal representative of an audible response to the one or more audible commands, and reproducing, based on the response audio signal, the audible response to the one or more audible commands.

Clause 34A. The method of any combination of clauses 24A-31A, wherein the computing device comprises a headset that includes an external microphone configured to capture the first audio signal, the housing to which the microphone is coupled, and at least one speaker, wherein obtaining the additional audio signals comprises activating, based on the verification, the audible interface by which to process the additional audio signals representative of the one or more audible commands to obtain a response audio signal representativev of an audible reponse to the one or more audible commands, and wherein the method further comprises reproducing, based on the response audio signal, the audible resopnse to the one or more audible commands.

Clause 35A. The method of any combination of clauses 24A-31A, wherein the computing device is communicatively coupled to a headset, and wherein obtaining the first audio signal comprises receiving the first audio signal, the second audio signal, and the additional audio signals, wherein obtaining the additional audio signals comprises activating, based on the verification, the audible interface by which to process the additional audio signals representative of the one or more audible commands to obtain a response audio signal representativev of an audible reponse to the one or more audible commands, and wherein the method further comprises transmitting the response audio signal to the headset.

Clause 36A. The method of any one of clauses 32A-35A, wherein the headset includes headphones.

Clause 37A. The method of any one of clauses 32A-35A, wherein the headset includes wireless headphones wirelessly coupled to the connected computing device.

Clause 38A. The method of any one of clauses 32A-37A, wherein the headset includes in-ear headphones.

Clause 39A. The method of any combination of clauses 24A-38A, wherein the microphone comprises a user facing microphone directed to the user of the computing device.

Clause 40A. The method of any combination of clauses 24A-38A, wherein the microphone comprises a microphone positioned proximate to an ear canal of the user of the computing device.

Clause 41A. The method of clause 40A, wherein the microphone positioned proximate to the ear canal comprises a microphone positioned within 3-5 centimeters (cm) of the ear canal of the user of the computing device.

Clause 42A. The method of any combination of clauses 24A-41A, wherein the computing device comprises a virtual reality device that includes the housing.

Clause 43A. The method of any combination of clauses 24A-41A, wherein the computing device comprises an augmented reality device that includes the housing.

Clause 44A. The method of any combination of clauses 24A-41A, wherein the computing device comprises a mixed reality device that includes the housing.

Clause 45A. The method of any combination of clauses 24A-41A, wherein the computing device comprises a head mounted display device that includes the housing.

Clause 46A. The method of any combinatino of clauses 24A-45A, wherein the housing includes an ear-cup-type component, and wherein the ear-cup-type component includes an over-ear-cup type component, an on-ear-cup-type component, and an in-ear-cup-type component.

Clause 47A. A computing device configured to support an audible interface, the computing device comprising: means for obtaining a first audio signal representative of an environment external to a user associated with the computing device; means for obtaining a second audio signal sensed by a microphone coupled to a housing; means for verifying, based on the first audio signal and the second audio signal, that the user activated the audible interface of the computing device; and means for obtaining, based on the verification, additional audio signals representative of one or more audible commands.

Clause 48A. The computing device of clause 47A, wherein the means for verifying that the user actived the audible interface comprises: means for obtaining, based on the first audio signal and the second audio signal, a coherence measure representative of a relationship between the first audio signal and the second audio signal; and means for verifying, based on the coherence measure, that the user activated the audible interface of the computing device.

Clause 49A. The computing device of any combination of clauses 47A and 48A, wherein the means for verifying that the user actived the audible interface comprises: means for obtaining, based on a left channel and a right channel of the second audio signal, a relative phase between the left channel and the right channel of the second audio signal; and means for verifying, based on the relative phase, that the user activated the audible interface of the computing device.

Clause 50A. The computing device of any combination of clauses 47A-49A, wherein the means for verifying that the user actived the audible interface comprises: means for comparing an amplitude of the first audio signal and an amplitude of the second audio signal; and means for verifying, based on the comparison of the amplitude of the first audio signal and the amplitude of the second audio signal, that the user activated the audible interface of the computing device.

Clause 51A. The computing device of any combination of clauses 47A-50A, wherein the means for verifying that the user actived the audible interface comprises: means for comparing a power of the first audio signal and a power of the second audio signal; and means for verifying, based on the comparison of the power of the first audio signal and a power of the second audio signal, that the user activated the audible interface of the computing device.

Clause 52A. The computing device of any combination of clauses 47A-51A, wherein the means for verifying that the user actived the audible interface comprises: means for obtaining, based on the first audio signal, a direction of arrival; and means for verifying, based on the direction of arrival and the second audio signal, that the user activated the audible interface of the computing device.

Clause 53A. The computing device of any combination of clauses 47A-52A, wherein the means for verifying that the user actived the audible interface comprises means for verifying, based on the first audio signal and the second audio signal and without performing a voice print analysis with respect to either the first audio signal or the second audio signal, that the user activated the audible interface of the computing device.

Clause 54A. The computing device of any combination of clauses 47A-53A, wherein the means for verifying that the user actived the audible interface comprises means for verifying, based on the first audio signal and the second audio signal, that the user and not an unauthorized entity activated the audible interface of the computing device.

Clause 55A. The computing device of any combination of clauses 47A-54A, wherein the computing device comprises a headset that includes an external microphone configured to capture the first audio signal and the housing to which the microphone is coupled, wherein the means for obtaining the additional audio signals comprises means for obtaining, from one or more of the external microphone and the microphone, the additional audio signals representative of the one or more audible commands, and wherein the computing device further comprises means for transmitting the additional audio signals to a connected computing device.

Clause 56A. The computing device of any combination of clauses 47A-54A, wherein the computing device comprises a headset that includes an external microphone configured to capture the first audio signal, the housing to which the microphone is coupled, and at least one speaker, wherein the means for obtaining the additional audio signals comprises means for obtaining, from one or more of the external microphone and the microphone, the additional audio signals representative of the one or more audible commands, wherein the computing device further comprises: means for transmitting the additional audio signals to a connected computing device; and means for receiving a response audio signal representative of an audible response to the one or more audible commands, and means for reproducing, based on the response audio signal, the audible response to the one or more audible commands.

Clause 57A. The computing device of any combination of clauses 47A-54A, wherein the computing device comprises a headset that includes an external microphone configured to capture the first audio signal, the housing to which the microphone is coupled, and at least one speaker, wherein the means for obtaining the additional audio signals comprises means for activating, based on the verification, the audible interface by which to process the additional audio signals representative of the one or more audible commands to obtain a response audio signal representativev of an audible reponse to the one or more audible commands, and wherein the computing device further comprises means for reproducing, based on the response audio signal, the audible resopnse to the one or more audible commands.

Clause 58A. The computing device of any combination of clauses 47A-54A, wherein the computing device is communicatively coupled to a headset, and wherein obtaining the first audio signal comprises receiving the first audio signal, the second audio signal, and the additional audio signals, wherein the means for obtaining the additional audio signals comprises means for activating, based on the verification, the audible interface by which to process the additional audio signals representative of the one or more audible commands to obtain a response audio signal representative of an audible reponse to the one or more audible commands, and wherein the computing device further comprises means for transmitting the response audio signal to the headset.

Clause 59A. The computing device of any one of clauses 55A-58A, wherein the headset includes headphones.

Clause 60A. The computing device of any one of clauses 55A-58A, wherein the headset includes wireless headphones wirelessly coupled to the connected computing device.

Clause 61A. The computing device of any one of clauses 55A-60A, wherein the headset includes in-ear headphones.

Clause 62A. The computing device of any combination of clauses 47A-61A, wherein the microphone comprises a user facing microphone directed to the user of the computing device.

Clause 63A. The computing device of any combination of clauses 47A-61A, wherein the microphone comprises a microphone positioned proximate to an ear canal of the user of the computing device.

Clause 64A. The computing device of clause 63A, wherein the microphone positioned proximate to the ear canal comprises a microphone positioned within 3-5 centimeters (cm) of the ear canal of the user of the computing device.

Clause 65A. The computing device of any combination of clauses 47A-64A, wherein the computing device comprises a virtual reality device that includes the housing.

Clause 66A. The computing device of any combination of clauses 47A-64A, wherein the computing device comprises an augmented reality device that includes the housing.

Clause 67A. The computing device of any combination of clauses 47A-64A, wherein the computing device comprises a mixed reality device that includes the housing.

Clause 68A. The computing device of any combination of clauses 47A-64A, wherein the computing device comprises a head mounted display device that includes the housing.

Clause 69A. The computing device of any combination of clauses 47A-68A, wherein the housing includes an ear-cup-type component, and wherein the ear-cup-type component includes an over-ear-cup type component, an on-ear-cup-type component, and an in-ear-cup-type component.

Clause 70A. A non-transitory computer readable storage medium storing instructions that, when executed, cause one or mroe processors of a computing device to: obtain a first audio signal representative of an environment external to a user associated with the computing device; obtain a second audio signal sensed by a microphone coupled to a housing; verify, based on the first audio signal and the second audio signal, that the user activated the audible interface of the computing device; and obtain, based on the verification, additional audio signals representative of one or more audible commands.

Various aspects of the techniques have been described. These and other aspects of the techniques are within the scope of the following claims.

What is claimed is:

1. A headset device configured to support an audible interface, the headset device comprising:
   a memory configured to store (i) a first audio signal, captured by an external microphone coupled to a housing of the headset device and facing away from a user wearing the headset device, wherein the first audio signal is representative of an environment external to the user wearing the headset device, and (ii) a second audio signal captured by an internal microphone coupled to the housing of the headset device and facing towards the user wearing the headset device; and
   one or more processors configured to:
      verify, based on the first audio signal and the second audio signal, that a self-voice signal of the user is detected that originated from the user wearing the headset device and not from an unauthorized entity that is not associated with the headset device, wherein the self-voice signal of the user includes a keyword based on processing one or more of the first audio signal and the second audio signal; and
      obtain, based on the verification, additional audio signals representative of one or more audible commands included in the self-voice signal of the user.

2. The headset device of claim 1, wherien the one or more processors are configured to:
   obtain, based on the first audio signal and the second audio signal, a coherence measure representative of a relationship between the first audio signal and the second audio signal; and
   perform the verification, based on the coherence measure, that the self-voice signal of the user includes the keyword; and
   activate the audible interface of the headset device, based on the verification.

3. The headset device of claim 1, wherien the one or more processors are configured to:
   obtain, based on a left channel and a right channel of the second audio signal, a relative phase between the left channel and the right channel of the second audio signal; and
   perform the verification, based on the relative phase, that the self-voice signal of the user includes the keyword; and
   activate the audible interface of the headset device, based on the perform.

4. The headset device of claim 1, wherien the one or more processors are configured to:

compare an amplitude of the first audio signal and an amplitude of the second audio signal; and perform the verification, based on the comparison of the amplitude of the first audio signal and the amplitude of the second audio signal, that the self-voice signal of the user includes the keyword; and activate the audible interface of the headset device, based on the perform.

5. The headset device of claim 1, wherien the one or more processors are configured to:

compare a power of the first audio signal and a power of the second audio signal; and perform the verification, based on the comparison of the power of the first audio signal and a power of the second audio signal, that the self-voice signal of the user includes the keyword; and activate the audible interface of the headset device, based on the perform.

6. The headset device of claim 1, wherien the one or more processors are configured to:

obtain, based on the first audio signal, a direction of arrival; and perform the verification, based on the direction of arrival and the second audio signal, that the self-voice signal of the user includes the keyword; and activate the audible interface of the headset device, based on the perform.

7. The headset device of claim 1, wherein the one or more processors are configured to perform the verification, based on the first audio signal and the second audio signal and without performing a voice print analysis with respect to either the first audio signal or the second audio signal, that the self-voice signal of the user includes the keyword; and activate the audible interface of the headset device, based on the verification.

8. The headset device of claim 1, wherein the one or more processors are configured to perform the verification based on the self-voice signal of the user and not the unauthorized entity.

9. The headset device of claim 1, further comprising:

the external microphone configured to capture the first audio signal and the housing to which the external microphone is coupled, and wherein the one or more processors are configured to obtain, from the external microphone, the internal microphone or both the external microphone and the internal microphone, the additional audio signals representative of the one or more audible commands included in the self-voice signal of the user; and a transceiver configured to transmit the additional audio signals to a connected device.

10. The headset device of claim 9, further comprising:

at least one loudspeaker, configured to reproduce, based on a response audio signal, an audible response to the one or more audible commands included in the self-voice signal of the user, and wherein the one or more processors are configured to receive the response audio signal, representative of the audible response to the one or more audible commands included in the self-voice signal of the user, from the connected device.

11. The headset device of claim 9, further comprising loudspeakers coupled to the housing.

12. The headset device of claim 11, further comprising loudspeakers wirelessly coupled to a connected device.

13. The headset device of claim 9, further comprising in-ear headphones.

14. The headset device of claim 1, further comprising the internal microphone.

15. The headset device of claim 1, wherein the internal microphone is positioned proximate to an ear canal of the user of the headset device.

16. The headset device of claim 15, wherein the internal microphone that is positioned proximate to the ear canal positioned within 3-5 centimeters (cm) of the ear canal of the user of the headset device.

17. The headset device of claim 1, wherein the headset device is a virtual reality device that includes the housing.

18. The headset device of claim 1, wherein the headset device is an augmented reality device that includes the housing.

19. The headset device of claim 1, wherein the headset device is a mixed reality device that includes the housing.

20. The headset device of claim 1, wherein the headset device is a head mounted display device that includes the housing.

21. The headset device of claim 1, wherein the housing includes an ear-cup-type component, and wherein the ear-cup-type component includes an over-ear-cup type component, an on- ear-cup-type component, and an in-ear-cup-type component.

22. A method of supporting an audible interface, the method comprising:

storing (i) a first audio signal, captured by an extenral microphone coupled to a housing of a headset device and facing away from a user wearing the headset device, wherein the first audio signal is representative of an environment external to the user wearing the headset device, and (ii) a second audio signal captured by an internal microphone coupled to the housing of the headset device and facing towards the user wearing the headset device;

verifying, based on the first audio signal and the second audio signal, that a self-voice signal of the user is detected that originated from the user wearing the headset device and not from an unauthorized entity that is not associated with the headset device, wherein the self-voice signal of the user includes a keyword based on processing one or more of the first audio signal and the second audio signal; and obtaining, based on the verifying, additional audio signals representative of one or more audible commands included in the self-voice signal of the user.

23. The method of claim 22, further comprising:

obtaining, based on the first audio signal and the second audio signal, a coherence measure representative of a relationship between the first audio signal and the second audio signal;

performing the verifying, based on the coherence measure, that the self-voice signal of the user includes the keyword; and activating the audible interface of the headset device, based on the performing.

24. The method of claim 22, further comprising:

obtaining, based on a left channel and a right channel of the second audio signal, a relative phase between the left channel and the right channel of the second audio signal;

performing the verifying, based on the relative phase, that the self-voice signal of the user includes the keyword; and activating the audible interface of the headset device, based on the performing.

25. The method of claim 22, further comprising:
comparing an amplitude of the first audio signal and an amplitude of the second audio signal;
performing the verifying, based on the comparison of the amplitude of the first audio signal and the amplitude of the second audio signal, that the self-voice signal of the user includes the keyword; and
activating the audible interface of the headset device, based on the performing.

26. The method of claim 22, further comprising:
comparing a power of the first audio signal and a power of the second audio signal;
performing the verifying, based on the comparison of the power of the first audio signal and a power of the second audio signal, that the self-voice signal of the user includes the keyword; and
activating the audible interface of the headset device, based on the performing.

27. A headset device configured to support an audible interface, the headset device comprising:
means for storing (i) a first audio signal, captured by an external microphone coupled to a housing of the headset device and facing away from a user wearing the headset device, wherein the first audio signal is representative of an environment external to the user wearing the headset device, and (ii) a second audio signal captured by an internal microphone coupled to the housing of the headset device and facing towards the user wearing the headset device;
means for obtaining a first audio signal representative of an environment external to the user associated with the headset device;
means for obtaining a second audio signal sensed by a microphone coupled to a housing;
means for verifying, based on the first audio signal and the second audio signal, that a self-voice signal of the user is detected that originated from the user wearing the headset device and not from an unauthorized entity that is not associated with the headset device, wherein the self-voice signal of the user includes a keyword based on processing one or more of the first audio signal and the second audio signal; and
means for obtaining, based on the means for verifying, additional audio signals representative of one or more audible commands included in the self-voice signal of the user.

28. A non-transitory computer readable storage medium storing instructions that, when executed, cause one or mroe processors of a headset device to:
store (i) a first audio signal, captured by an external microphone coupled to a housing of the headset device and facing away from a user wearing the headset device, wherein the first audio signal is representative of an environment external to the user wearing the headset device, and (ii) a second audio signal captured by an internal microphone coupled to the housing of the headset device and facing towards the user wearing the headset device;
obtain a first audio signal representative of an environment external to the user associated with the headset device;
obtain a second audio signal sensed by a microphone coupled to a housing;
verify, based on the first audio signal and the second audio signal, that a self-voice signal of the user is detected that originated from the user wearing the headset device and not from an unauthorized entity that is not associated with the headset device, wherein the self-voice signal of the user includes a keyword based on processing one or more of the first audio signal and the second audio signal; and
obtain, based on the verification, additional audio signals representative of one or more audible commands included in the self-voice signal of the user.

* * * * *